United States Patent
Xu et al.

(10) Patent No.: US 12,261,537 B2
(45) Date of Patent: Mar. 25, 2025

(54) INTERLEAVED PHASE CURRENT BALANCING

(71) Applicant: TEXAS INSTRUMENTS INCORPORATED, Dallas, TX (US)

(72) Inventors: Shanguang Xu, Plano, TX (US); Hua Tang, Shenzhen (CN); Zhaofu Zhou, Shenzhen (CN); Teng Feng, Shenzhen (CN); Ian L. Bower, Bedford, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 241 days.

(21) Appl. No.: 17/872,387

(22) Filed: Jul. 25, 2022

(65) Prior Publication Data

US 2024/0014742 A1    Jan. 11, 2024

Related U.S. Application Data

(60) Provisional application No. 63/388,211, filed on Jul. 11, 2022.

(51) Int. Cl.
*H02M 3/335*    (2006.01)
*H02M 1/00*    (2007.01)
*H02M 3/00*    (2006.01)

(52) U.S. Cl.
CPC ..... *H02M 3/33576* (2013.01); *H02M 1/0009* (2021.05); *H02M 1/0043* (2021.05); *H02M 3/01* (2021.05); *H02M 3/33573* (2021.05)

(58) Field of Classification Search
CPC ...... H02M 3/01; H02M 3/158; H02M 3/1584; H02M 3/1586; H02M 3/1588; H02M 3/22; H02M 3/24; H02M 3/28; H02M 3/285; H02M 3/315; H02M 3/3155; H02M 3/325; H02M 3/335; H02M 3/33507; H02M 3/33515; H02M 3/33523; H02M 3/3353; H02M 3/33538; H02M 3/33546; H02M 3/33553; H02M 3/33561; H02M 3/33569; H02M 3/33571; H02M 3/33573;

(Continued)

(56) References Cited

U.S. PATENT DOCUMENTS 9,035,628 B2 * 5/2015 Chan ................. H02J 1/102
                                                                323/272
9,263,951 B2 * 2/2016 Figge ................. H02M 3/01

(Continued)

OTHER PUBLICATIONS

Hu, Zhiyuan et al., "An Interleaved LLC Resonant Converter Operating at Constant Switching Frequency", IEEE Transactions on Power Electronics, vol. 29, No. 6, Jun. 2014, pp. 2931-2943.

*Primary Examiner* — Thienvu V Tran
*Assistant Examiner* — Carlos O Rivera-Perez
(74) *Attorney, Agent, or Firm* — Charles F. Koch; Frank D. Cimino

(57) ABSTRACT

In at least one example, an apparatus includes a current sense circuit, an imbalance detector, and a current balancer. The current sense circuit including a first phase input, a second phase input, a first sense output, and a second sense output. The imbalance detector having a detector output, a first detector input, and second detector input. The first detector input is coupled to the first sense output and the second detector input is coupled to the second sense output. The current balancer having a balancer input and a balancer output. The balancer input is coupled to the detector output.

17 Claims, 15 Drawing Sheets

(58) Field of Classification Search
CPC ......... H02M 3/33576; H02M 3/33584; H02M 3/33592; H02M 3/3372; H02M 1/0003; H02M 1/0009; H02M 1/0025; H02M 1/0043; H02M 1/0067
USPC ............ 363/15–21.18, 37, 65–72, 79; 323/212–219, 271–278, 282–287, 304, 323/311, 312, 315, 351
See application file for complete search history.

(56) References Cited

U.S. PATENT DOCUMENTS

| | | | |
|---|---|---|---|
| 9,490,704 B2* | 11/2016 | Jang | ............ H02M 3/33571 |
| 2016/0191284 A1* | 6/2016 | Izawa | ............ H04B 1/0475 |
| | | | 375/375 |

* cited by examiner

INTERLEAVED PHASE CURRENT BALANCING

CROSS-REFERENCE TO RELATED APPLICATIONS

The present application claims priority to U.S. Provisional Patent Application No. 63/388,211, which was filed Jul. 11, 2022, is titled "INTERLEAVED PHASE CURRENT BALANCING," and is hereby incorporated herein by reference in its entirety.

BACKGROUND

A power converter is a circuit, component, or device that converts electrical power from one form to another form. For example, a power converter can convert alternating current (AC) power to direct current (DC) power, DC power to AC power, one form of AC power to another form of AC power, or one form of DC power to another form of DC power. A multi-phase converter can include multiple power converters coupled in parallel. Each paralleled power converter can represent a different phase of electrical power conversion in the multi-phase converter. Electrical power conversion in the multi-phase converter can involve distributing current among different phase converters of the multi-phase converter operating in parallel. Balancing current distribution among the different phase converters operating in parallel can be useful to reduce loss (e.g., conduction loss and/or switching loss), reduce thermal stress on components of the multi-phase converter, and/or reduce component sizes.

SUMMARY

In at least one example, an apparatus includes a current sense circuit, an imbalance detector, and a current balancer. The current sense circuit including a first phase input, a second phase input, a first sense output, and a second sense output. The imbalance detector having a detector output, a first detector input, and second detector input. The first detector input is coupled to the first sense output and the second detector input is coupled to the second sense output. The current balancer having a balancer input and a balancer output. The balancer input is coupled to the detector output.

In at least one example, a system includes a multi-phase converter and a controller. The multi-phase converter having a first phase converter and a second phase converter coupled in a current sharing configuration. The controller is coupled to the multi-phase converter. The controller includes an imbalance detector and a current balancer. The imbalance detector is configured to, responsive to a first current flowing through the first phase converter and a second current flowing through the second phase converter, provide an error signal. The error signal is indicative of a difference between the first current and the second current. The current balancer is coupled between a gate driver of the multi-phase converter and the imbalance detector. The current balancer is configured to, responsive to the error signal, control a phase-shift angle between drive signals provided to different switches of the first phase converter.

DETAILED DESCRIPTION

Figure 1:
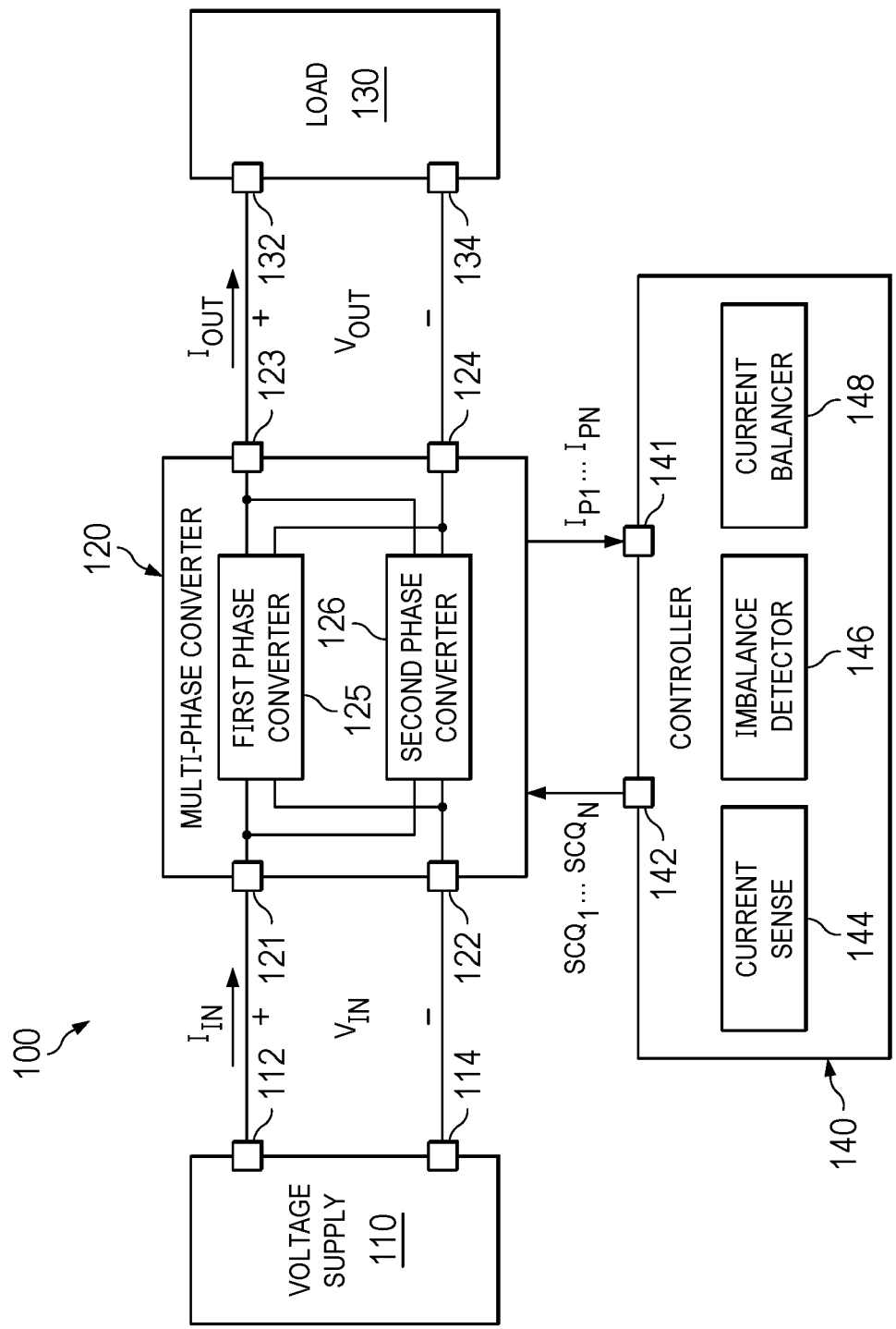
FIG. 1 is a block diagram of an example system for power conversion.

As described above, electrical power conversion in a multi-phase converter can involve distributing current among different phase converters of the multi-phase converter operating in parallel. Operating a multi-phase converter as an interleaved power converter can be useful to distribute current among the different phase converters operating in parallel. Different phase converters of the multi-phase converter can have different resonant frequencies due to component tolerance ranges and/or component ageing. Different phase converters of the multi-phase converter operating at a given switching frequency can have different gain characteristics (e.g., voltage gain) responsive to resonant frequency mismatches between the different phase converters. Differences in gain characteristics among different phase converters of the multi-phase converter can cause unbalanced current distribution among the different phase converters. Unbalanced current distribution among the different phase converters operating in parallel can increase loss (e.g., conduction loss and/or switching loss), increase thermal stress on components of the multi-phase converter, and otherwise adversely affect operation of the multi-phase converter.

Some approaches may exist for reducing unbalanced current distribution among different phase converters of a multi-phase converter by reducing resonant frequency mismatches between the different phase converters. These approaches may increase power consumption and/or component costs by introducing an additional circuit in each different phase converter of the multi-phase converter for resonant frequency tuning to reduce resonant frequency mismatches. These approaches may also increase manufacturing costs by introducing the labor-intensive process of manually sorting resonant components during assembly to account for deviating component values within associated component tolerance ranges.

Aspects of this description relate to a controller with current balancing functionality to reduce unbalanced current distribution among different phase converters of a multi-phase converter. In at least one example, the controller includes a current balancer configured to control a phase-shift angle between switching control signals provided to control operation of different switches in a given phase converter of the multi-phase converter. Responsive to the phase-shift angle changing in value, unbalanced current distribution between different phase converters of the multi-phase converter can be reduced. Accordingly, controlling unbalanced current distribution among the different phase converters involves controlling switching control signals provided by the controller rather than reducing resonant frequency mismatches between the different phase converters. Power consumption and/or component cost increases associated with introducing additional circuit in the different phase converters for resonant frequency tuning can be avoided. Manufacturing cost increases associated with manually sorting resonant components to reduce resonant frequency mismatches can also be avoided.

FIG. 1 is a block diagram of an example system 100 for power conversion. At least some implementations of the system 100 are representative of an application environment for a controller with current balancing, as described above. In at least some examples, the system 100 includes a voltage supply 110 having a first supply output 112 and a second supply output 114. The system 100 also includes a multi-phase converter 120 having a first converter input 121, a second converter input 122, a first converter output 123, and a second converter output 124. The multi-phase converter 120 is an n-phase converter, where n is an integer greater than one. In FIG. 1, the multi-phase converter 120 is a 2-phase converter with two phases that include a first phase converter 125, and a second phase converter 126. In other examples, the multi-phase converter 120 can have more (e.g., three) phases. Each phase (e.g., the first phase converter 125 and/or the second phase converter 126) of the multi-phase converter 120 is a power converter that is configured to convert electrical power from one form to another form. In at least one example, each phase (e.g., the first phase converter 125 and/or the second phase converter 126) of the multi-phase converter 120 is identical or substantially similar to other phases of the multi-phase converter 120 in terms of component parameters and component layout. The system 100 also includes: a load 130 having a first load input 132 and a second load input 134; and a controller 140 having a controller input 141, a controller output 142, a current sense circuit 144, an imbalance detector 146, and a current balancer 148. In at least one example, the controller 140 may be implemented by a microcontroller, a processor, a microcomputer, digital circuitry, analog circuitry, field programmable gate array, an application specific integrated circuit, memory and/or software.

In an example architecture of the system 100, the first converter input 121 and the second converter input 122 are coupled to the first supply output 112 and the second supply output 114, respectively. The first converter output 123 and the second converter output 124 are coupled to the first load input 132 and the second load input 134, respectively. The first phase converter 125 and the second phase converter 126 are coupled in a current sharing configuration (e.g., in parallel) between the voltage supply 110 and the load 130. In at least one example, coupling the first phase converter 125 and the second phase converter 126 in the current sharing configuration can be useful to operate the multi-phase converter 120 as an interleaved power converter. The multi-phase converter 120 is coupled to the controller 140 via the controller input 141 and the controller output 142. In at least one example, the current sense circuit 144 is coupled to a secondary side of the multi-phase converter 120 via the controller input 141, as described below. In this example, the current sense circuit 144 can provide sense currents that are proportional to currents flowing on the secondary side of the multi-phase converter 120. In at least one example, the current balancer 148 is coupled to a primary side of the multi-phase converter 120 via the controller output 142, as described below.

In an example operation of the system 100, the controller 140 is configured to provide switching control signals (e.g., $SCQ_1 \ldots SCQ_N$) to the multi-phase converter 120 via the controller output 142. In at least one example, the controller 140 is configured to provide the switching control signals to the multi-phase converter 120, as pulse width modulated signals. Responsive to the switching control signals, the multi-phase converter 120 is configured to convert an input voltage ($V_{IN}$) provided by the voltage supply 110 into an output voltage ($V_{OUT}$) provided to the load 130. Converting $V_{IN}$ into $V_{OUT}$ can involve operating the multi-phase converter 120 as an interleaved power converter. To that end, each phase (e.g., the first phase converter 125 and the second phase converter 126) of the multi-phase converter 120 is operated out of phase with respect to other phases of the multi-phase converter 120 at a same or substantially similar switching frequency as the other phases. For example, the first phase converter 125 can be operated out of phase (e.g., about 90 degrees out of phase) with respect to the second phase converter 126 while the first phase converter 125 and the second phase converter 126 each operate at a same switching frequency (e.g., about 100 kilohertz (kHz)). In at least one example, controlling a phase-shift angle (e.g., an intraphase delay) between switching control signals provided to different phase converters of the multi-phase converter 120 can be useful to operate each phase converter of the multi-phase converter 120 out of phase with respect to the other phase converters of the multi-phase converter 120.

Current (e.g., a current ($I_{IN}$) flowing from the voltage supply 110 and/or a current ($I_{OUT}$) flowing to the load 130) can be distributed among different phase converters of the multi-phase converter 120 operating as an interleaved power converter. While each phase (e.g., the first phase converter 125 and/or the second phase converter 126) of the multi-phase converter 120 may be identical or substantially similar to other phases of the multi-phase converter 120 in terms of component parameters and component layout, resonant frequency mismatches may exist between different phase converters of the multi-phase converter 120. For example, different phase converters of the multi-phase converter 120 can have different resonant frequencies due to component tolerance ranges and/or component ageing. Resonant frequency mismatches between different phase converters of the multi-phase converter 120 can cause unbalanced current distribution among the different phase converters.

The controller 140 can obtain indications of current flowing through different phase converters (e.g., a first phase current ($I_{P1}$) flowing through the first phase converter 125 and/or a second phase current ($I_{P2}$) flowing through the second phase converter 126) of the multi-phase converter 120 via the controller input 141. Such indications of current flowing through different phase converters of the multi-phase converter 120 can be provided to the imbalance detector 146 to facilitate detecting unbalanced current distribution among the different phase converters. Reducing unbalanced current distribution among the different phase converters of the multi-phase converter 120 can involve switching control signals provided via the controller output 142. As described in greater detail below, controlling a phase-shift angle (e.g., an intraphase delay) between switching control signals to control operation of different switches in one phase converter of the multi-phase converter 120. In at least one example, the controller 140 can reduce unbalanced current distribution among different phase converters of the multi-phase converter 120 without controlling resonant frequency mismatches between the different phase converters.

Figure 2:
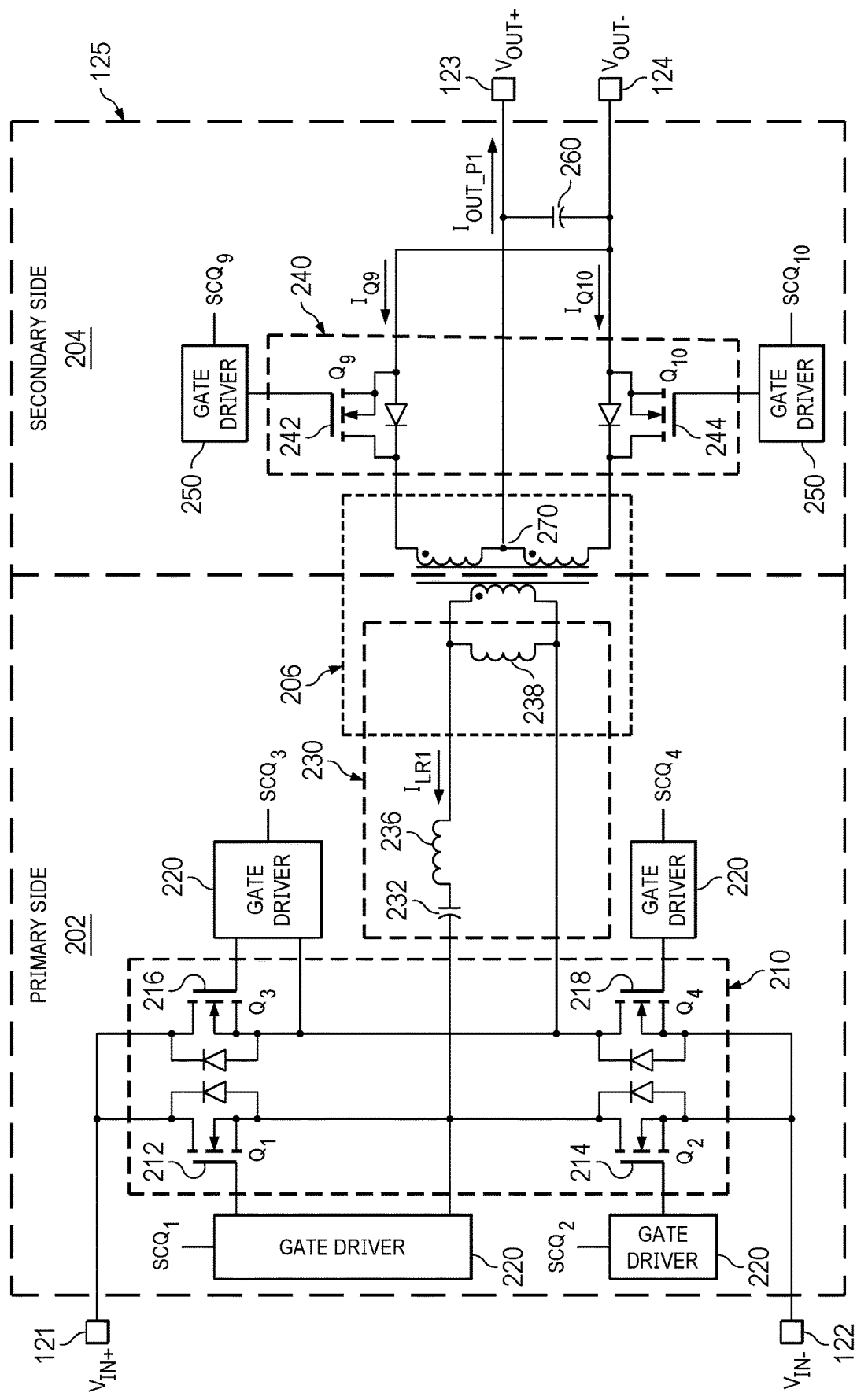
FIG. 2 is a schematic diagram of an example implementation of the first phase converter.

FIG. 2 is a schematic diagram of an example implementation of the first phase converter 125. In at least some examples, the first phase converter 125 includes a primary side 202 and a secondary side 204 that is electrically isolated from the primary side 202 by a transformer 206. The primary side 202 includes a switching circuit 210 with transistors ($Q_1$) 212, ($Q_2$) 214, ($Q_3$) 216, and ($Q_4$) 218. The transistors 212, 214, 216, and 218 are coupled to each other in a configuration that forms a full-bridge switching circuit implementing the switching circuit 210. For example, a drain of the transistor 212 is coupled to a drain of the transistor 216, a source of the transistor 212 is coupled to a drain of the transistor 214, a source of the transistor 214 is coupled to a source of the transistor 218, and a source of the transistor 216 is coupled to a drain of the transistor 218. The transistors 212 and 214 form a first leg of the switching circuit 210. The transistors 216 and 218 form a second leg of the switching circuit 210. The primary side 202 also includes a gate driver 220 and a resonant tank 230. The gate driver 220 includes a driver input interface and a driver output interface. The driver input interface of the gate driver 220 is coupled to the controller output 142. The driver output interface of the gate driver 220 is coupled to the respective gates of transistors 212, 214, 216, and 218. The resonant tank 230 includes a resonant capacitance 232, a resonant inductance 234, and a magnetic inductance 236 of the transformer 206. The resonant tank 230 is coupled between the switching circuit 210 and a primary winding of the transformer 206.

The secondary side 204 includes a rectifier circuit 240 with transistors ($Q_9$) 242 and ($Q_{10}$) 244. The secondary side 204 also includes a gate driver 250 and a capacitor 260. The gate driver 250 includes a driver input interface and a driver output interface. The driver input interface of the gate driver 250 is coupled to the controller output 142. The driver output interface of the gate driver 250 is coupled to the respective gates of transistors 242 and 244. A drain of the transistor 242 and a drain of the transistor 244 are coupled to a first terminal and a second terminal of a secondary winding of the transformer 206, respectively. A source of the transistor 242 is coupled to a source of the transistor 244, to a first terminal of the capacitor 260, and to the second converter output 124. A second terminal of the capacitor 260 is coupled to the first converter output 123 and to a tap (e.g., a center tap) of the secondary winding of the transformer 206.

In an example operation of the first phase converter 125, the driver input interface of the gate driver 220 is configured to receive a number of switching control signals (e.g., $SCQ_1 \ldots SCQ_4$) provided at the controller output 142. In at least one example, the switching control signals provided at the controller output 142 have the same or substantially similar switching frequency. The driver output interface of the gate driver 220 is configured to provide, responsive to the switching control signals, drive signals to the respective gates of transistors 212, 214, 216, and 218. The switching circuit 210 is configured to provide, responsive to the drive signals, an alternating current (AC) voltage based on $V_{IN+}$ provided at the first converter input 121 to the resonant tank 230. In at least one example, the AC voltage has a switching frequency of the switching control signals to the resonant tank 230. The resonant tank 230 is configured to provide, responsive to the AC voltage, an AC current (e.g., $I_{LR1}$) to the primary winding of the transformer 206 based on a resonant frequency of the resonant tank 230. The AC current provided by the resonant tank 230 is coupled between the primary and secondary windings of the transform 206 by operation of the rectifier circuit 240 responsive to drive signals provided by the gate driver 250. The rectifier circuit 240 is configured to provide, responsive to the drive signals provided by the gate driver 250, a rectified voltage to the capacitor 260 based on the AC current. The capacitor 260 is configured to filter the rectified voltage and provide $V_{OUT+}$ at the first converter output 123.

In FIG. 2, the first phase converter 125 is a full-bridge LLC resonant converter with the switching circuit 210 being implemented as a full-bridge switching circuit and the resonant tank 230 being implemented as an LLC resonant tank. In other examples, the first phase converter 125 can be a different type of power converter with the switching circuit 210 being implemented as a different switching circuit (e.g., a half-bridge switching circuit) and/or the resonant tank 230 being implemented as a different resonant tank (e.g., an LC resonant tank). In at least one example, the transistor 242 and/or the transistor 244 can be implemented with a diode or another semiconductor device.

Figure 3:
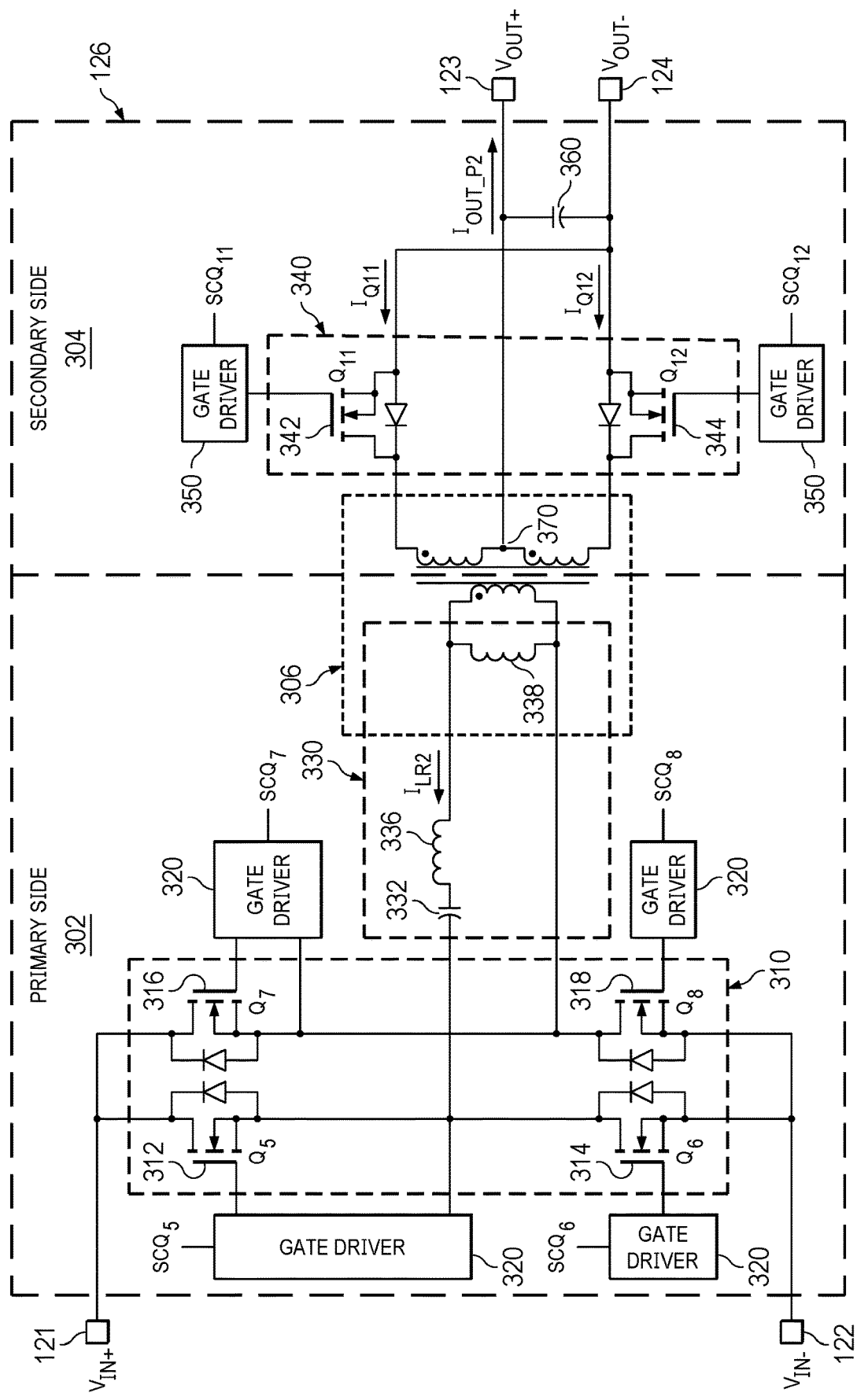
FIG. 3 is a schematic diagram of an example implementation of the second phase converter.

FIG. 3 is a schematic diagram of an example implementation of the second phase converter 126. In at least some examples, the second phase converter 126 includes a primary side 302 and a secondary side 304 that is electrically isolated from the primary side 302 by a transformer 306. The primary side 302 includes a switching circuit 310 with transistors ($Q_5$) 312, ($Q_6$) 314, ($Q_7$) 316, and ($Q_8$) 318. The transistors 312, 314, 316, and 318 are coupled to each other in a configuration that forms a full-bridge switching circuit implementing the switching circuit 310. For example, a drain of the transistor 312 is coupled to a drain of the transistor 316, a source of the transistor 312 is coupled to a drain of the transistor 314, a source of the transistor 314 is coupled to a source of the transistor 318, and a source of the transistor 316 is coupled to a drain of the transistor 318. The transistors 312 and 314 form a first leg of the switching circuit 310. The transistors 316 and 318 form a second leg of the switching circuit 310. The primary side 302 also includes a gate driver 320 and a resonant tank 330. The gate driver 320 includes a driver input interface and a driver output interface. The driver input interface of the gate driver 320 is coupled to the controller output 142. The driver output interface of the gate driver 320 is coupled to the respective gates of transistors 312, 314, 316, and 318. The resonant tank 330 includes a resonant capacitance 332, a resonant inductance 334, and a magnetic inductance 336 of the transformer 306. The resonant tank 330 is coupled between the switching circuit 310 and a primary winding of the transformer 306. In at least one example, the resonant tank 330 can be identical or substantially similar to the resonant tank 230 of FIG. 2 in terms of component parameters and component layout.

The secondary side 304 includes a rectifier circuit 340 with transistors ($Q_{11}$) 342 and ($Q_{12}$) 344. The secondary side 304 also includes a gate driver 350 and a capacitor 360. The gate driver 350 includes a driver input interface and a driver output interface. The driver input interface of the gate driver 350 is coupled to the controller output 142. The driver output interface of the gate driver 350 is coupled to the respective gates of transistors 342 and 344. A drain of the transistor 342 and a drain of the transistor 344 are coupled to a first terminal and a second terminal of a secondary winding of the transformer 306, respectively. A source of the transistor 342 is coupled to a source of the transistor 344, to a first terminal of the capacitor 360, and to the second converter output 124. A second terminal of the capacitor 360 is coupled to the first converter output 123 and to a tap (e.g., a center tap) of the secondary winding of the transformer 306.

In an example operation of the second phase converter 126, the driver input interface of the gate driver 320 is configured to receive a number of switching control signals (e.g., $SCQ_5 \ldots SCQ_8$) provided at the controller output 142. In at least one example, the switching control signals provided at the controller output 142 have the same or substantially similar switching frequency. The driver output interface of the gate driver 320 is configured to provide, responsive to the switching control signals, drive signals to the respective gates of transistors 312, 314, 316, and 318. The switching circuit 310 is configured to provide, responsive to the drive signals, an AC voltage based on $V_{IN+}$ provided at the first converter input 121 to the resonant tank 330. In at least one example, the AC voltage has a switching frequency of the switching control signals to the resonant tank 330. The resonant tank 330 is configured to provide, responsive to the AC voltage, an AC current (e.g., $I_{LR2}$) to the primary winding of the transformer 306 based on a resonant frequency of the resonant tank 330. The AC current provided by the resonant tank 330 is coupled between the primary and secondary windings of the transform 306 by operation of the rectifier circuit 340 responsive to drive signals provided by the gate driver 350. The rectifier circuit 340 is configured to provide, responsive to the drive signals provided by the gate driver 350, a rectified voltage to the capacitor 360 based on the AC current. The capacitor 360 is configured to filter the rectified voltage and provide $V_{OUT+}$ at the first converter output 123.

In FIG. 3, the second phase converter 126 is a full-bridge LLC resonant converter with the switching circuit 310 being implemented as a full-bridge switching circuit and the resonant tank 330 being implemented as an LLC resonant tank. In other examples, the second phase converter 126 can be a different type of power converter with the switching circuit 310 being implemented as a different switching circuit (e.g., a half-bridge switching circuit) and/or the resonant tank 330 being implemented as a different resonant tank (e.g., an LC resonant tank). In at least one example, the transistor 342 and/or the transistor 344 can be implemented with a diode or another semiconductor device.

Figure 4:
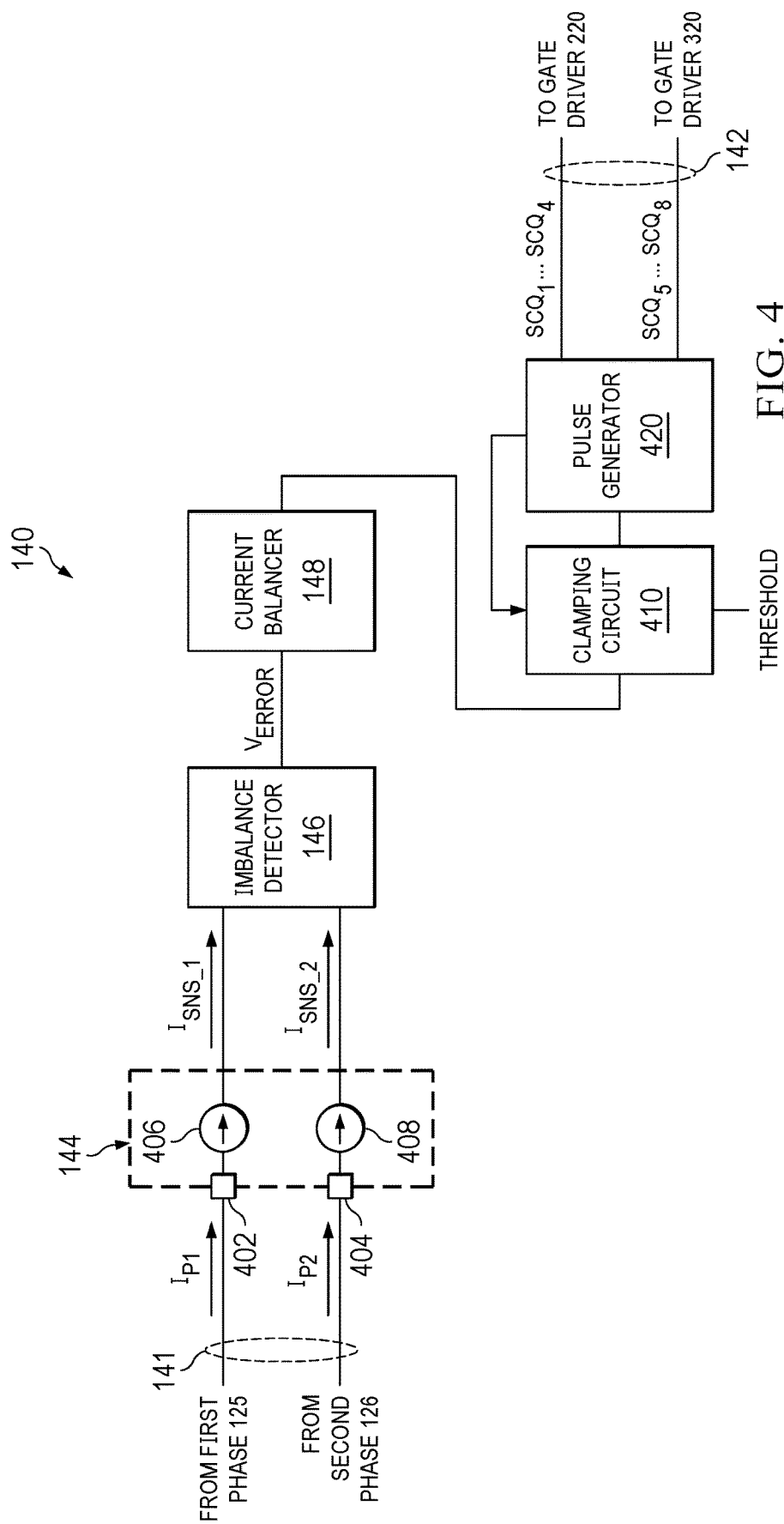
FIG. 4 is a block diagram of an example implementation of the controller.

FIG. 4 is a diagram of an example implementation of a portion of the controller 140. In at least some examples, FIG. 4 is representative of a block-level implementation of, at least, a portion of the controller 140 as shown in FIG. 1. For example, the controller 140 as shown in FIG. 4 includes the current sense circuit 144, the imbalance detector 146, and the current balancer 148. In at least some examples, the current sense circuit 144 includes a first phase input 402, a second phase input 404, a first current source 406, and a second current source 408; and the controller 140 also includes a clamping circuit 410 and a pulse generator 420. The pulse generator 420 is configured to provide switching control signals via the controller output 142 to control operation of the multi-phase converter 120. For example, the pulse generator 420 is configured to provide a number of switching control signals (e.g., $SCQ_1$, $SCQ_2$, $SCQ_3$, and/or $SCQ_4$) to the driver input interface of the gate driver 220 via the controller output 142 to control operation of the first phase converter 125 of the multi-phase converter 120. Another example, is configured to provide a number of switching control signals (e.g., $SCQ_5$, $SCQ_6$, $SCQ_7$, and/or $SCQ_8$) to the driver input interface of the gate driver 320 via the controller output 142 to control operation of the second phase converter 126 of the multi-phase converter 120.

In an example architecture of the controller 140, the first phase input 402 is coupled to the first phase converter 125 via the controller input 141. In at least one example, the first phase input 402 is coupled to the tap 270 of the transformer 206 in the secondary side 204 of the first phase converter 125. In at least one example, the first phase input 402 is coupled to a terminal (e.g., a source and/or a drain) of a semiconductor device (e.g., the transistor 242 and/or the transistor 244) forming the rectifier circuit 240 in the secondary side 204 of the first phase converter 125. The second phase input 404 is coupled to the second phase converter 126 via the controller input 141. In at least one example, the second phase input 404 is coupled to the tap 370 of the transformer 306 in the secondary side 304 of the second phase converter 126. In at least one example, the second phase input 404 is coupled to a terminal (e.g., a source and/or a drain) of a semiconductor device (e.g., the transistor 342 and/or the transistor 344) forming the rectifier circuit 340 in the secondary side 304 of the second phase converter 126.

The current source 406 is coupled between the first phase input 402 and a first sense output of the current sense circuit 144. In at least one example, the first current source 406 is a current mirror configured to mirror $I_{P1}$ flowing through the first phase converter 125 to the first detector input. The current source 408 is coupled between the second phase input 404 and a second sense output of the current sense circuit 144. In at least one example, the second current source 408 is a current mirror configured to mirror $I_{P2}$ flowing through the second phase converter 126 to the second detector input. A first detector input of the imbalance detector 146 is coupled to the first sense output of the current sense circuit 144. A second detector input of the imbalance detector 146 is coupled to the second sense output of the current sense circuit 144. A detector output of the imbalance detector 146 is coupled to a balancer input of the current balancer 148. A balancer output of the current balancer 148 is coupled to a clamping input of the clamping circuit 410. A clamping output of the clamping circuit 410 is coupled to a generator input of the pulse generator 420. A first generator output and a second generator output of the pulse generator 420 are coupled to the driver input interface of the gate driver 220 and to the driver input interface of the gate driver 320, respectively, via the controller output 142.

In an example operation of the controller 140, the current sources 406 and 408 of the current sense circuit 144 are configured to provide a first sense current ($I_{SNS\_1}$) and a second sense current ($I_{SNS\_2}$). $I_{SNS\_1}$ and $I_{SNS\_2}$ can be proportional to $I_{P1}$ flowing through the first phase converter 125 and to $I_{P2}$ flowing through the second phase converter 126, respectively. In at least one example, $I_{P1}$ and/or $I_{P2}$ are a first phase output current (e.g., $I_{OUT\_P1}$) and/or a second phase output current (e.g., $I_{OUT\_P2}$), respectively. In at least one example, $I_{P1}$ and/or $I_{P2}$ can be a first phase rectifier current (e.g., $I_{Q9}$ and/or $I_{Q10}$) and/or a second phase rectifier current (e.g., $I_{Q11}$ and/or $I_{Q12}$), respectively. The imbalance detector 146 is configured to provide, responsive to $I_{SNS\_1}$ and $I_{SNS\_2}$, an error signal ($V_{ERROR}$) that is indicative of a difference ($\Delta I$) between $I_{P1}$ and $I_{P2}$. Stated differently, imbalance detector 146 is configured to provide, responsive to $I_{SNS\_1}$ and $I_{SNS\_2}$, $V_{ERROR}$ that is indicative of unbalanced current distribution between the first phase converter 125 and the second phase converter 126. Being proportional to $I_{P1}$ and to $I_{P2}$, respectively, $I_{SNS\_1}$ and $I_{SNS\_2}$ can be useful to determine $\Delta I$ or the unbalanced current distribution between the first phase converter 125 and the second phase converter 126.

The current balancer 148 is configured to control, responsive to $V_{ERROR}$, a phase-shift angle ($\Phi_{PN}$) between drive signals provided to different switches of a given phase converter of the multi-phase converter 120. A value of $\Phi_{PN}$ can be inversely related to a current ($I_{PN}$) flowing through the given phase converter of the multi-phase converter 120. Accordingly, controlling $\Phi_{PN}$ can be useful to control $I_{PN}$ flowing through the given phase converter of the multi-phase converter 120. In at least one example, the multi-phase converter 120 is configured to reduce, responsive to $\Phi_{PN}$ changing in value, $\Delta I$ without controlling an asymmetry (e.g., resonance mismatch) between resonant frequencies of the first phase converter 125 and the second phase converter 126. In at least one example, the multi-phase converter 120 is configured to decrease, responsive to $\Phi_{P1}$ increasing in value, $I_{P1}$ to reduce $\Delta I$ or the unbalanced current distribution between the first phase converter 125 and the second phase converter 126. In at least one example, the multi-phase converter 120 is configured to increase, responsive to $\Phi_{P1}$ decreasing in value, $I_{P1}$ to reduce $\Delta I$ or the unbalanced current distribution between the first phase converter 125 and the second phase converter 126. In at least one example, the multi-phase converter 120 is configured to decrease, responsive to $\Phi_{P2}$ increasing in value, $I_{P2}$ to reduce $\Delta I$ or the unbalanced current distribution between the first phase converter 125 and the second phase converter 126. In at least one example, the multi-phase converter 120 is configured to increase, responsive to $\Phi_{P2}$ decreasing in value, $I_{P2}$ to reduce $\Delta I$ or the unbalanced current distribution between the first phase converter 125 and the second phase converter 126.

The clamping circuit 410 is configured to control, responsive to $\Phi_{PN}$ exceeding a programmed value ($\Phi_{TH}$), $\Phi_{PN}$ to $\Phi_{TH}$. A feedback path between the pulse generator 420 and the clamping circuit 410 can be useful to maintain $\Phi_{PN}$ within a range of values that the given phase converter of the multi-phase converter 120 can support. In at least one example, $\Phi_{TH}$ can represent an upper bound of the range of values. The pulse generator 420 is configured to control, responsive to $\Phi_{PN}$, a delay between switching control signals provided to a gate driver providing the drive signals to the different switches of the given phase converter.

Figure 5:
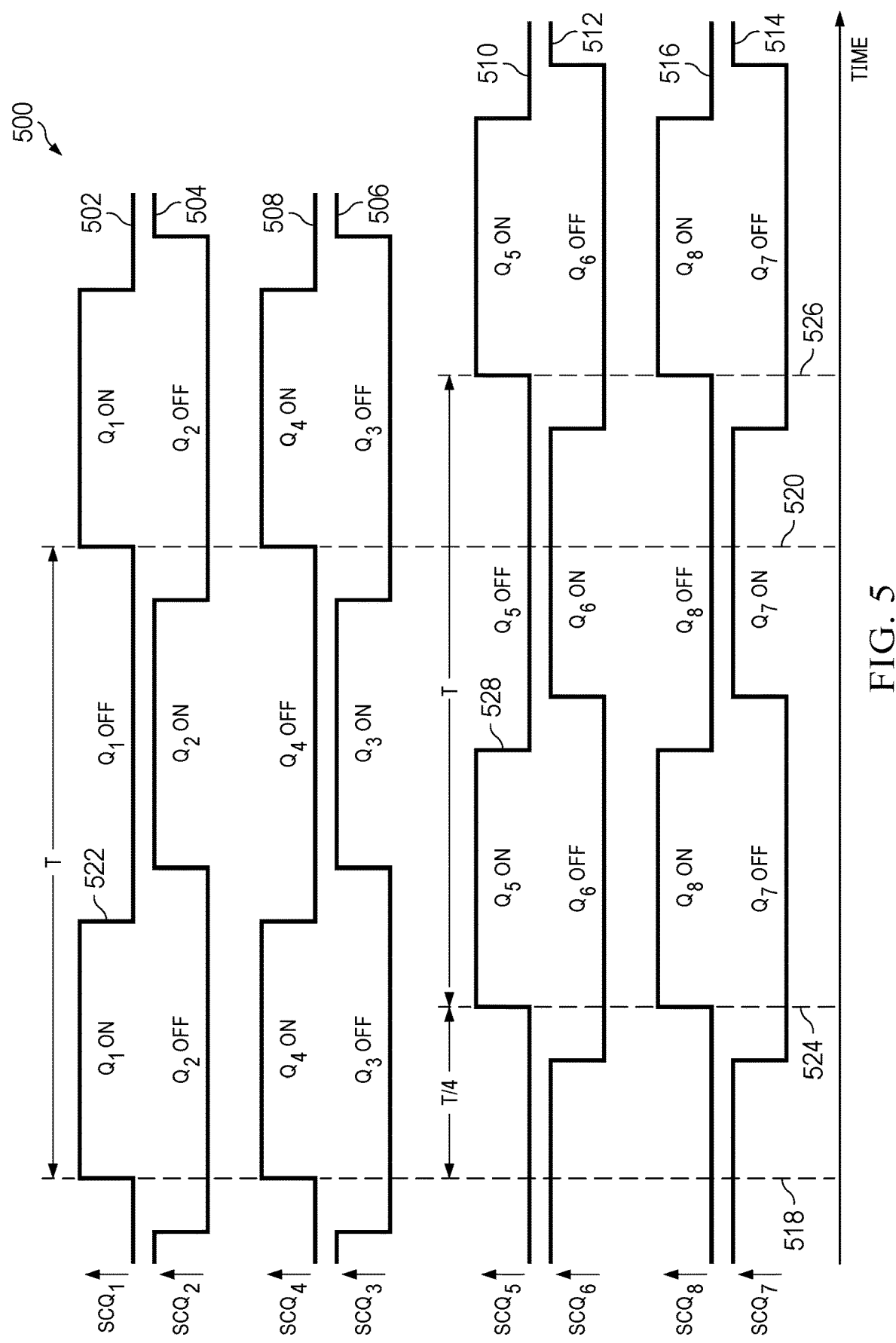
FIG. 5 is a diagram of example waveforms in the multi-phase converter with current balancing.

FIG. 5 is a diagram 500 of example waveforms in the multi-phase converter 120 during balanced current distribution. The diagram 500 represents different voltages in the multi-phase converter 120 as a function of time. The diagram 500 includes waveforms 502, 504, 506, 508, 510, 512, 514, and 516. Waveforms 502, 504, 506, and 508 correspond to switching control signals (e.g., $SCQ_1$, $SCQ_2$, $SCQ_3$, and/or $SCQ_4$) provided by the controller 140 to control operation of the switching circuit 210 in the primary side 202 of the first phase converter 125. In at least one example, the waveform 502 and the waveform 504 can be a complementary pair of switching control signals that are useful to control operation of a first leg of the switching circuit 210 formed by the transistor 212 and the transistor 214. In at least one example, the waveform 506 and the waveform 508 can be a complementary pair of switching control signals that are useful to control operation of a second leg of the switching circuit 210 formed by the transistor 216 and the transistor 218. Waveforms 510, 512, 514, and 516 correspond to switching control signals (e.g., $SCQ_5$, $SCQ_6$, $SCQ_7$, and/or $SCQ_8$) provided by the controller 140 to control operation of the switching circuit 310 in the primary side 302 of the second phase converter 126. In at least one example, the waveform 510 and the waveform 512 can be a complementary pair of switching control signals that are useful to control operation of a first leg of the switching circuit 310 formed by the transistor 312 and the transistor 314. In at least one example, the waveform 514 and the waveform 516 can be a complementary pair of switching control signals that are useful to control operation of a second leg of the switching circuit 310 formed by the transistor 316 and the transistor 318.

Waveform 502 includes a rising transition at time 518 and a rising transition at time 520. Waveform 502 also includes a falling transition 522 between the rising transition at time 518 and the rising transition at time 520. A time interval between time 518 and time 520 represents a switching period T of waveform 502 that is an inverse of a switching frequency of waveform 502. Waveform 510 includes a rising transition at time 524 and a rising transition at time 526. Waveform 510 also includes a falling transition 528 between the rising transition at time 524 and the rising transition at time 526. A time interval between time 524 and time 526 represents a switching period T of waveform 510 that is an inverse of a switching frequency of waveform 510. The switching period T of waveform 502 can be the same or substantially similar to the switching period T of waveform 510. Accordingly, the switching frequency of waveform 502 can be the same or substantially similar to the switching frequency of waveform 510. The diagram 500 shows that the controller 140 can operate the switching circuit 210 of the first phase converter 125 and the switching circuit 310 of the second phase converter 126 at the same or substantially same switching frequency.

A time interval between time 518 corresponding to the rising transition of waveform 502 and time 524 corresponding to the rising transition of waveform 510 represents a phase-shift angle (e.g., an intraphase delay) between switching control signals provided to different phase converters of the multi-phase converter 120. The phase-shift angle between switching control signals provided by the controller 140 to control operation of different phase converters of the multi-phase converter 120 can be useful to control a phase-shift angle (e.g., an intraphase delay) between drive signals provided to the different phase converters. The time interval between time 518 and time 524 is about a quarter of the switching period T of waveform 502 or a quarter of switching period T of waveform 510. As described above, the switching period T of waveform 502 can be the same or substantially similar to the switching period T of waveform 510. Accordingly, waveform 510 is shifted by about degrees with respect to waveform 502. The diagram 500 also shows that the controller 140 can operate each phase converter of the multi-phase converter 120 out of phase with respect to the other phase converters of the multi-phase converter 120 to operate the multi-phase converter 120 as an interleaved power converter.

Waveform 508 includes a rising transition at time 518 corresponding to the rising transition of waveform 502. Waveform 516 includes a rising transition at time 524 corresponding to the rising transition of waveform 510. The diagram 500 also shows that a phase-shift angle (e.g., $\Phi_{PN}$)

between switching control signals provided by the controller 140 to control operation of different switches of a given phase converter of the multi-phase converter 120 can be zero or about zero during balanced current distribution. The phase-shift angle (e.g., $\Phi_{PN}$) between switching control signals provided by the controller 140 to control operation of the different switches can be useful to control a phase-shift angle (e.g., $\Phi_{PN}$) between drive signals provided to the different switches.

Figure 6:
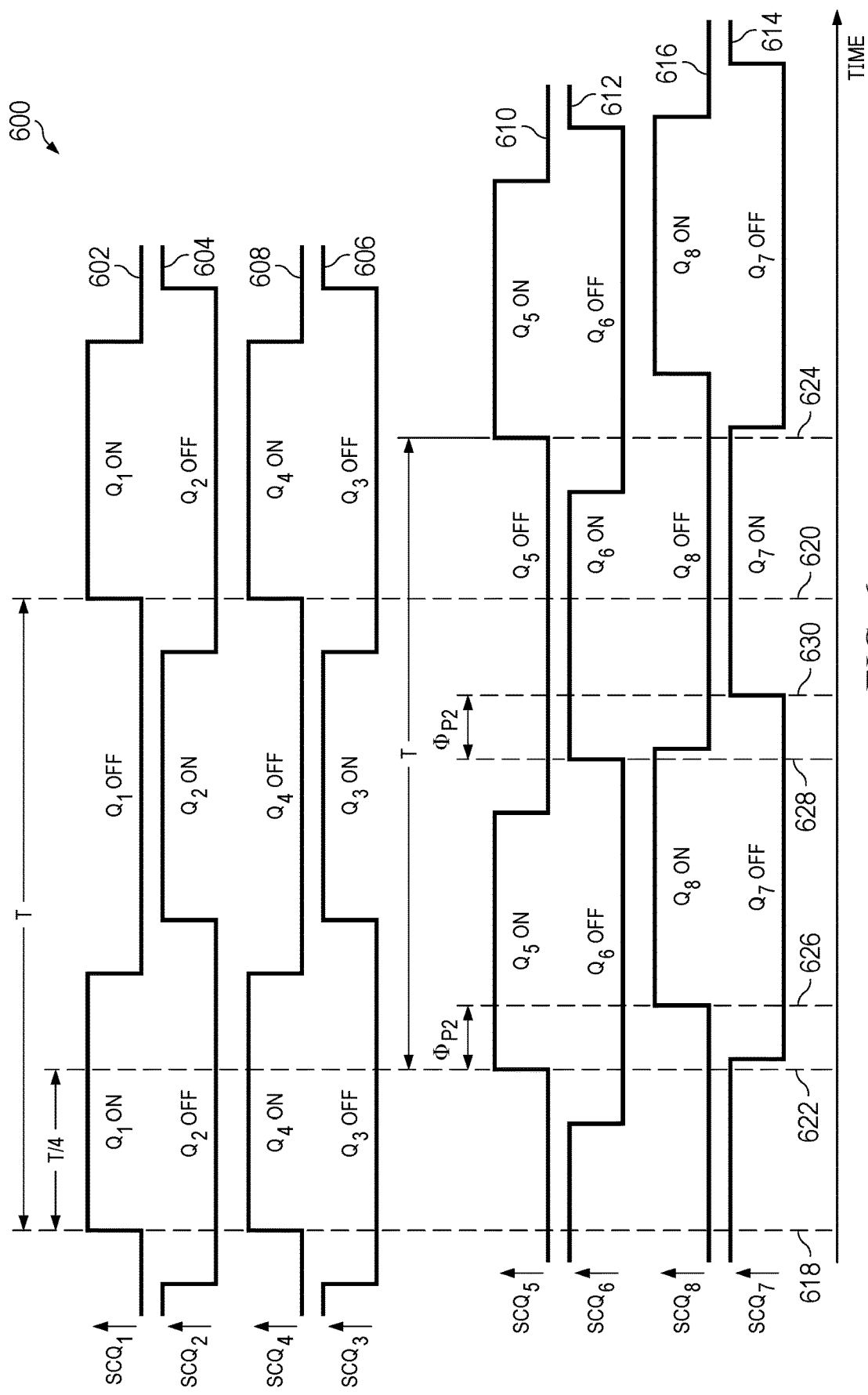
FIG. 6 is a diagram of example waveforms in the multi-phase converter with current balancing.

FIG. 6 is a diagram 600 of example waveforms in the multi-phase converter 120 during unbalanced current distribution. The diagram 600 represents different voltages in the multi-phase converter 120 as a function of time. The diagram 600 includes waveforms 602, 604, 606, 608, 610, 612, 614, and 616. Waveforms 602, 604, 606, and 608 correspond to switching control signals (e.g., $SCQ_1$, $SCQ_2$, $SCQ_3$, and/or $SCQ_4$) provided by the controller 140 to control operation of the switching circuit 210 in the primary side 202 of the first phase converter 125. In at least one example, the waveform 602 and the waveform 604 can be a complementary pair of switching control signals that are useful to control operation of a first leg of the switching circuit 210 formed by the transistor 212 and the transistor 214. In at least one example, the waveform 606 and the waveform 608 can be a complementary pair of switching control signals that are useful to control operation of a second leg of the switching circuit 210 formed by the transistor 216 and the transistor 218. Waveforms 610, 612, 614, and 616 correspond to switching control signals (e.g., $SCQ_5$, $SCQ_6$, $SCQ_7$, and/or $SCQ_8$) provided by the controller 140 to control operation of the switching circuit 310 in the primary side 302 of the second phase converter 126. In at least one example, the waveform 610 and the waveform 612 can be a complementary pair of switching control signals that are useful to control operation of a first leg of the switching circuit 310 formed by the transistor 312 and the transistor 314. In at least one example, the waveform 614 and the waveform 616 can be a complementary pair of switching control signals that are useful to control operation of a second leg of the switching circuit 310 formed by the transistor 316 and the transistor 318.

Waveform 602 includes a rising transition at time 618 and a rising transition at time 620. A time interval between time 618 and time 620 represents a switching period T of waveform 602 that is an inverse of a switching frequency of waveform 602. Waveform 610 includes a rising transition at time 622 and a rising transition at time 624. A time interval between time 622 and time 624 represents a switching period T of waveform 610 that is an inverse of a switching frequency of waveform 610. The switching period T of waveform 602 can be the same or substantially similar to the switching period T of waveform 610. Accordingly, the switching frequency of waveform 602 can be the same or substantially similar to the switching frequency of waveform 610. The diagram 600 shows that the controller 140 can operate the switching circuit 210 of the first phase converter 125 and the switching circuit 310 of the second phase converter 126 at the same or substantially same switching frequency. In at least one example, the switching period T of waveform 602 is the same or substantially similar to the switching period T of waveform 502 in FIG. 5. In at least one example, the switching period T of waveform 610 is the same or substantially similar to the switching period T of waveform 510 in FIG. 5.

A time interval between time 618 corresponding to the rising transition of waveform 602 and time 622 corresponding to the rising transition of waveform 610 represents a phase-shift angle (e.g., an intraphase delay) between switching control signals provided by the controller 140 to control operation of different phase converters of the multi-phase converter 120. The phase-shift angle between switching control signals provided by the controller 140 to control operation of the different phase converters can be useful to control a phase-shift angle (e.g., an intraphase delay) between drive signals provided to the different phase converters. The time interval between time 618 and time 622 is about a quarter of the switching period T of waveform 602 or a quarter of switching period T of waveform 610. As described above, the switching period T of waveform 602 can be the same or substantially similar to the switching period T of waveform 610. Accordingly, waveform 610 is shifted by about 90 degrees with respect to waveform 602. The diagram 600 also shows that the controller 140 can operate each phase converter of the multi-phase converter 120 out of phase with respect to the other phase converters of the multi-phase converter 120 to operate the multi-phase converter 120 as an interleaved power converter.

Waveform 616 includes a rising transition at time 626. A time interval between time 622 corresponding to the rising transition of waveform 610 and time 626 corresponding to the rising transition of waveform 616 represents a phase-shift angle (e.g., $\Phi_{P2}$) between switching control signals provided by the controller 140 to control operation of different switches (e.g., transistor 312 and transistor 318) of the second phase converter 126. In at least one example, the different switches (e.g., transistor 312 and transistor 318) can be diagonally opposing switches in different legs of a full-bridge switching circuit, as shown by FIG. 3. With reference to FIG. 6, waveform 612 includes a rising transition at time 628 and waveform 614 includes a rising transition at time 630. A time interval between time 628 corresponding to the rising transition of waveform 612 and time 630 corresponding to the rising transition of waveform 614 also represents a phase-shift angle (e.g., $\Phi_{P2}$) between switching control signals provided by the controller 140 to control operation of different switches (e.g., transistor 314 and transistor 316) of the second phase converter 126. In at least one example, the time interval between time 622 and time 626 can be the same or substantially similar to the time interval between time 628 and time 630. In at least one example, the different switches (e.g., transistor 314 and transistor 316) can be diagonally opposing switches in different legs of a full-bridge switching circuit, as shown by FIG. 3.

A phase-shift angle (e.g., $\Phi_{PN}$) between switching control drive signals provided by the controller 140 to control operation of different switches of a given phase converter of the multi-phase converter 120 can be directly related to a phase-shift angle (e.g., $\Phi_{PN}$) between drive signals provided to the different switches. For example, increasing a phase-shift angle between switching control drive signals provided by the controller 140 to control operation of different switches of a given phase converter of the multi-phase converter 120 can increase a phase-shift angle between drive signals provided to the different switches. Another example, decreasing a phase-shift angle between switching control drive signals provided by the controller 140 to control operation of different switches of a given phase converter of the multi-phase converter 120 can decrease a phase-shift angle between drive signals provided to the different switches. As described above, a value of a phase-shift angle between drive signals provided to different switches of a given phase converter of the multi-phase converter 120 can be inversely related to current flowing through the given phase converter. Being directly related to a phase-shift angle of drive signals provided to different switches of a given phase converter of the multi-phase converter 120, a phase-shift angle between switching control signals provided by the controller 140 to control operation of the different switches can be inversely related to current flowing through the given phase converter. Accordingly, controlling a phase-shift angle between switching control signals provided by the controller 140 to control operation of different switches of a given phase converter of the multi-phase converter 120 can be useful to control current flowing through the given phase converter.

Figure 7:
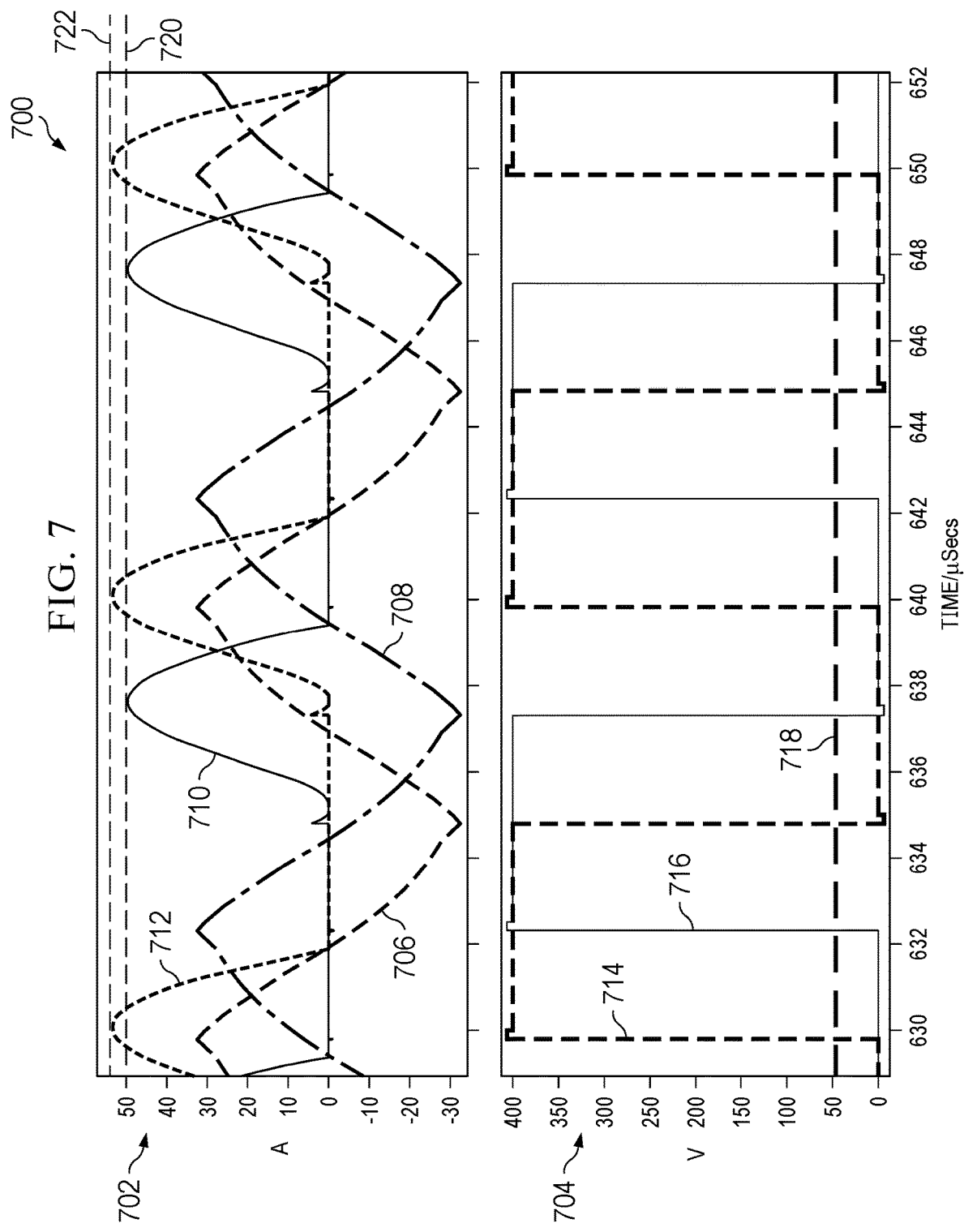
FIG. 7 is a diagram of example waveforms in the multi-phase converter without current balancing.
Figure 8:
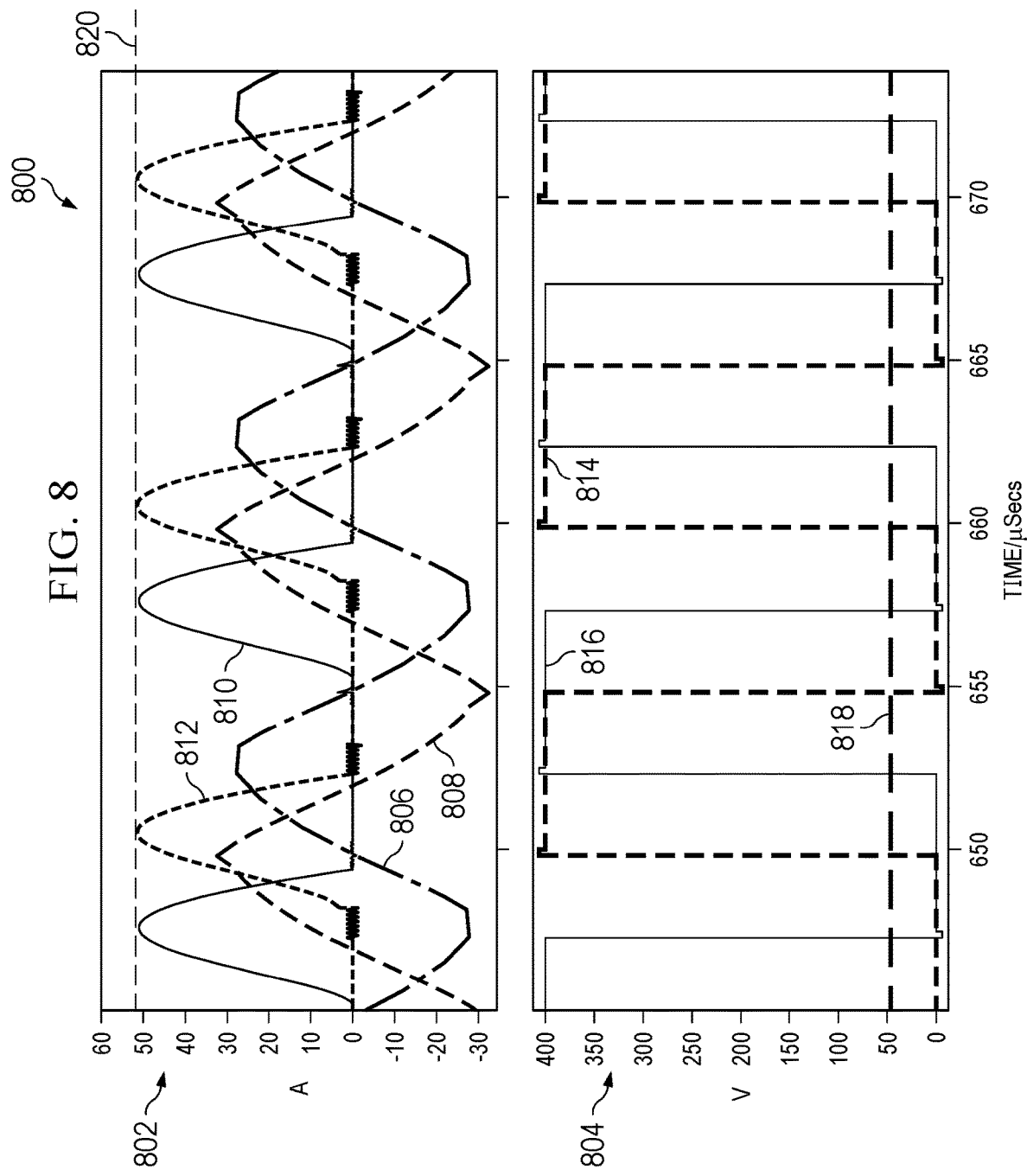
FIG. 8 is a diagram of example waveforms in the multi-phase converter with current balancing.

FIG. 7 and FIG. 8 are diagrams of example waveforms that each show simulated operation of an example implementation of the multi-phase converter 120. In FIG. 7 and FIG. 8, the first phase converter 125 and the second phase converter 126 of the multi-phase converter 120 can have different resonant tank parameters. The different resonant tank parameters can include the resonant capacitance 232, the resonant inductance 234, the resonant capacitance 332, and the resonant inductance 334 having values of about 400 nanofarads (nF), about 6.2 microhenries (µH), about 400 nF, and about 6.0 µH, respectively. Accordingly, the resonant inductance 334 of the second phase converter 126 has a value that is about 3% less than a value of the resonant inductance 234 of the first phase converter 125. With the different resonant tank parameters, the first phase converter 125 and the second phase converter 126 can have different resonant frequencies of about 101.1 kHz and about 102.7 kHz, respectively. The simulated operations shown in FIG. 7 and FIG. 8 each involve $V_{IN}$, $V_{OUT}$, and $I_{OUT}$ having values of about 400 volts, about 46 volts, and about 50 amps, respectively.

For the simulated operation shown in FIG. 7, a controller without current balancing operates each phase converter of the multi-phase converter 120 at a switching frequency of 100 kHz. In FIG. 7, the switching frequency is less than both the resonant frequency of the first phase converter 125 and the resonant frequency of the second phase converter 126. The diagram 700 includes plots 702 and 704. Plot 702 represents different currents flowing in the multi-phase converter 120 as a function of time. Plot 704 represents different voltages in the multi-phase converter 120 as a function of time. Waveforms 706 and 708 of the plot 702 correspond to $I_{LR1}$ and $I_{LR2}$ flowing through the primary side 202 of the first phase converter 125 and the primary side 302 of the second phase converter 126, respectively. Waveforms 710 and 712 of the plot 702 correspond to $I_{QSR1}$ and $I_{QSR3}$ flowing through the secondary side 204 of the first phase converter 125 and the secondary side 304 of the second phase converter 126, respectively. Waveforms 714, 716, and 718 of the plot 704 correspond to a drain-source voltage ($V_{DS\_Q2}$) of the transistor 214 in the switching circuit 210 of the first phase converter 125, a drain-source voltage ($V_{DS\_Q6}$) of the transistor 314 in the switching circuit 310 of the second phase converter 126, and $V_{OUT+}$ provided at the first converter output 123, respectively. Without current balancing, a peak current level 720 of $I_{QSR1}$ in plot 702 is less than a peak current level 722 of $I_{QSR3}$, responsive to the first phase converter 125 and the second phase converter 126 having different resonant frequencies. For example, the peak current level 722 of $I_{QSR3}$ is about 3.5 amps (A) greater than the peak current level 720 of $I_{QSR1}$ at the switching frequency of about 100 kHz.

For the simulated operation shown in FIG. 8, the controller 140 with current balancing operates each phase of the multi-phase converter 120 at a switching frequency of about 100 kHz. In FIG. 8, the switching frequency is less than both the resonant frequency of the first phase converter 125 and the resonant frequency of the second phase converter 126. The diagram 800 includes plots 802 and 804. Plot 802 represents different currents flowing in the multi-phase converter 120 as a function of time. Plot 804 represents different voltages in the multi-phase converter 120 as a function of time. Waveforms 806 and 808 of the plot 802 correspond to $I_{LR1}$ and $I_{LR2}$ flowing through the primary side 202 of the first phase converter 125 and the primary side 302 of the second phase converter 126, respectively. Waveforms 810 and 812 of the plot 802 correspond to $I_{QSR1}$ and $I_{QSR3}$ flowing through the secondary side 204 of the first phase converter 125 and the secondary side 304 of the second phase converter 126, respectively. Waveforms 814, 816, and 818 of the plot 804 correspond to $V_{DS\_Q2}$ of the transistor 214 in the switching circuit 210 of the first phase converter 125, $V_{DS\_Q6}$ of the transistor 314 in the switching circuit 310 of the second phase converter 126, and $V_{OUT+}$ provided at the first converter output 123, respectively. With current balancing, respective peak current levels of $I_{QSR1}$ and $I_{QSR3}$ are each about a peak current level 820 in plot 802, notwithstanding the first phase converter 125 and the second phase converter 126 having different resonant frequencies. One aspect of such current balancing involves the current balancer 144 of the controller 140 controlling a phase-shift angle between a pair of drive signals, as described above. A comparison between FIG. 7 and FIG. 8 shows that the controller 140 is useful to balance current distribution between different phase converters of the multi-phase converter 120 without controlling a resonant frequency mismatch between the different phase converters.

Figure 9:
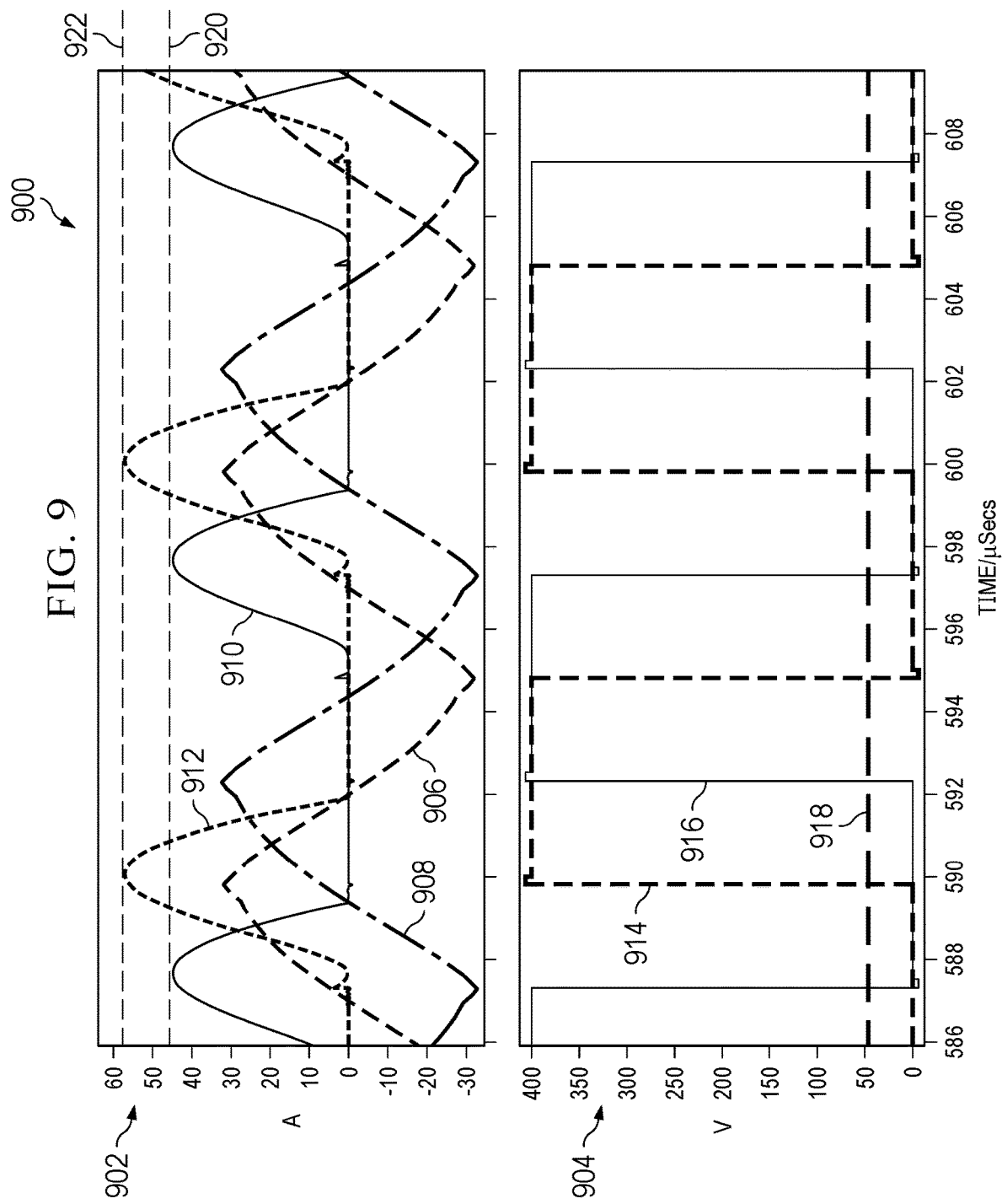
FIG. 9 is a diagram of example waveforms in the multi-phase converter without current balancing.
Figure 10:
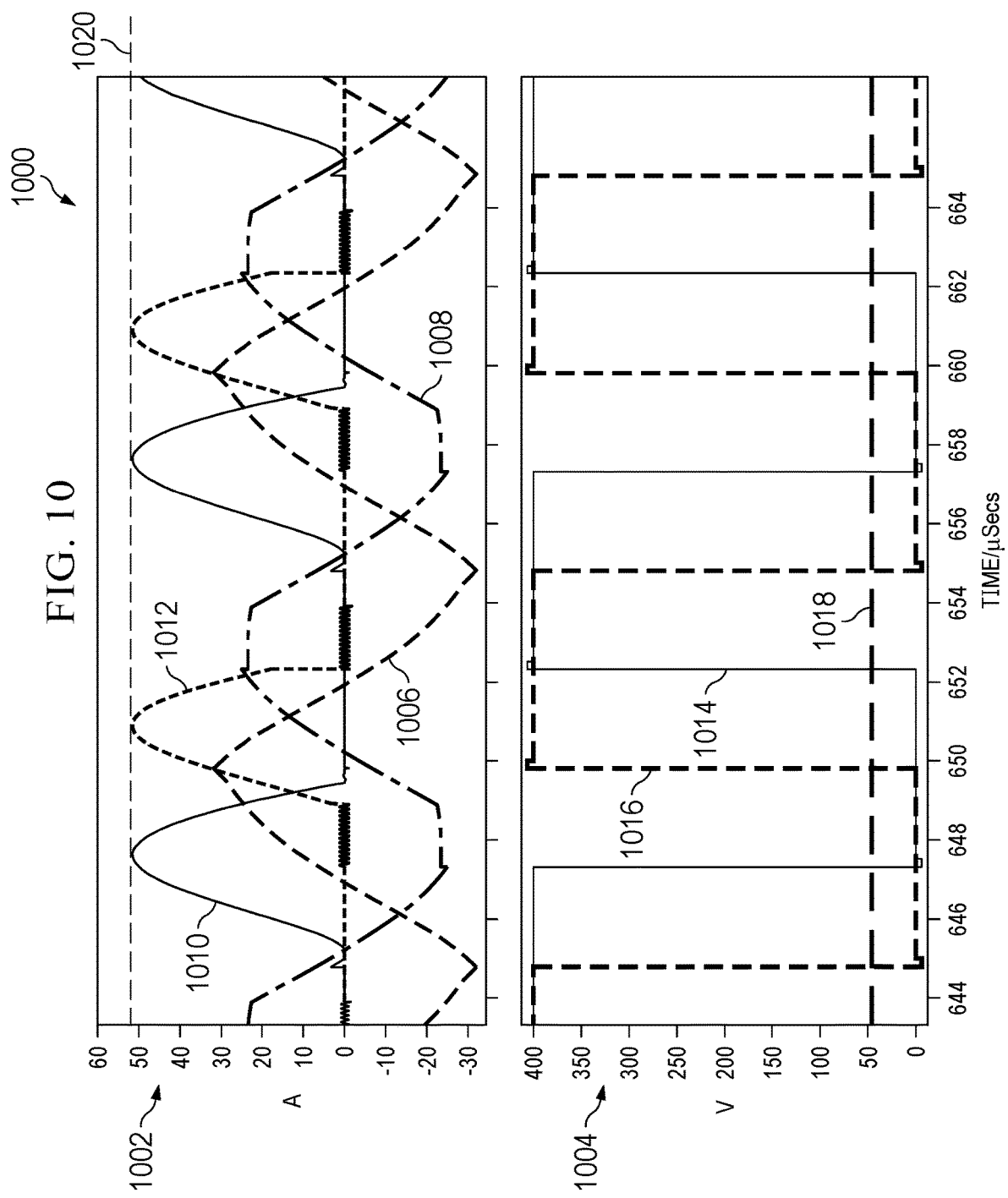
FIG. 10 is a diagram of example waveforms in the multi-phase converter with current balancing.

FIG. 9 and FIG. 10 are diagrams of example waveforms that each show simulated operation of an example implementation of the multi-phase converter 120. In FIG. 9 and FIG. 10, the first phase converter 125 and the second phase converter 126 of the multi-phase converter 120 can have different resonant tank parameters. The different resonant tank parameters can include the resonant capacitance 232, the resonant inductance 234, the resonant capacitance 332, and the resonant inductance 334 having values of about 400 nF, about 6.6 µH, about 400 nF, and about 6.0 µH, respectively. Accordingly, the resonant inductance 334 of the second phase converter 126 has a value that is about 9% less than a value of the resonant inductance 234 of the first phase converter 125. With the different resonant tank parameters, the first phase converter 125 and the second phase converter 126 can have different resonant frequencies of about 98.0 kHz and about 102.7 kHz, respectively. The simulated operations shown in FIG. 9 and FIG. 10 each involve $V_{IN}$, $V_{OUT}$, and $I_{OUT}$ having values of about 400 volts, about 46 volts, and about 50 amps, respectively.

For the simulated operation shown in FIG. 9, a controller without current balancing operates each phase converter of the multi-phase converter 120 at a switching frequency of about 100 kHz. In FIG. 9, the switching frequency is greater than the resonant frequency of the first phase converter 125 and less than the resonant frequency of the second phase converter 126. The diagram 900 includes plots 902 and 904. Plot 902 represents different currents flowing in the multi-phase converter 120 as a function of time. Plot 904 represents different voltages in the multi-phase converter 120 as a function of time. Waveforms 906 and 908 of the plot 902 correspond to km and $I_{LR2}$ flowing through the primary side 202 of the first phase converter 125 and the primary side 302 of the second phase converter 126, respectively. Waveforms 910 and 912 of the plot 902 correspond to $I_{QSR1}$ and $I_{QSR3}$ flowing through the secondary side 204 of the first phase converter 125 and the secondary side 304 of the second phase converter 126, respectively. Waveforms 914, 916, and 918 of the plot 904 correspond to $V_{DS\_Q2}$ of the transistor 214 in the switching circuit 210 of the first phase converter 125, $V_{DS\_Q6}$ of the transistor 314 in the switching circuit 310 of the second phase converter 126, and $V_{OUT+}$ provided at the first converter output 123, respectively. Without current balancing, a peak current level 920 of $I_{QSR1}$ in plot 902 is less than a peak current level 922 of $I_{QSR3}$, responsive to the first phase converter 125 and the second phase converter 126 having different resonant frequencies. For example, the peak current level 922 of $I_{QSR3}$ is about 11.5 A greater than the peak current level 920 of $I_{QSR1}$ at the switching frequency of about 100 kHz.

For the simulated operation shown in FIG. 10, the controller 140 with current balancing operates each phase the multi-phase converter 120 at a switching frequency of about 100 kHz. In FIG. 10, the switching frequency is greater than the resonant frequency of the first phase converter 125 and less than the resonant frequency of the second phase converter 126. The diagram 1000 includes plots 1002 and 1004. Plot 1002 represents different currents flowing in the multi-phase converter 120 as a function of time. Plot 1004 represents different voltages in the multi-phase converter 120 as a function of time. Waveforms 1006 and 1008 of the plot 1002 correspond to $I_{LR1}$ and $I_{LR2}$ flowing through the primary side 202 of the first phase converter 125 and the primary side 302 of the second phase converter 126, respectively. Waveforms 1010 and 1012 of the plot 1002 correspond to $I_{QSR1}$ and $I_{QSR3}$ flowing through the secondary side 204 of the first phase converter 125 and the secondary side 304 of the second phase converter 126, respectively. Waveforms 1014, 1016, and 1018 of the plot 1004 correspond to $V_{DS\_Q2}$ of the transistor 214 in the switching circuit 210 of the first phase converter 125, $V_{DS\_Q6}$ of the transistor 314 in the switching circuit 310 of the second phase converter 126, and $V_{OUT+}$ provided at the first converter output 123, respectively. With current balancing, respective peak current levels of $I_{QSR1}$ and $I_{QSR3}$ are each about a peak current level 1020 in plot 1002, notwithstanding the first phase converter 125 and the second phase converter 126 having different resonant frequencies. One aspect of such current balancing involves the current balancer 144 of the controller 140 controlling a phase-shift angle between a pair of drive signals, as described above. A comparison between FIG. 9 and FIG. 10 shows that the controller 140 is useful to balance current distribution between different phase converters of the multi-phase converter 120 without controlling a resonant frequency mismatch between the different phase converters.

Figure 11:
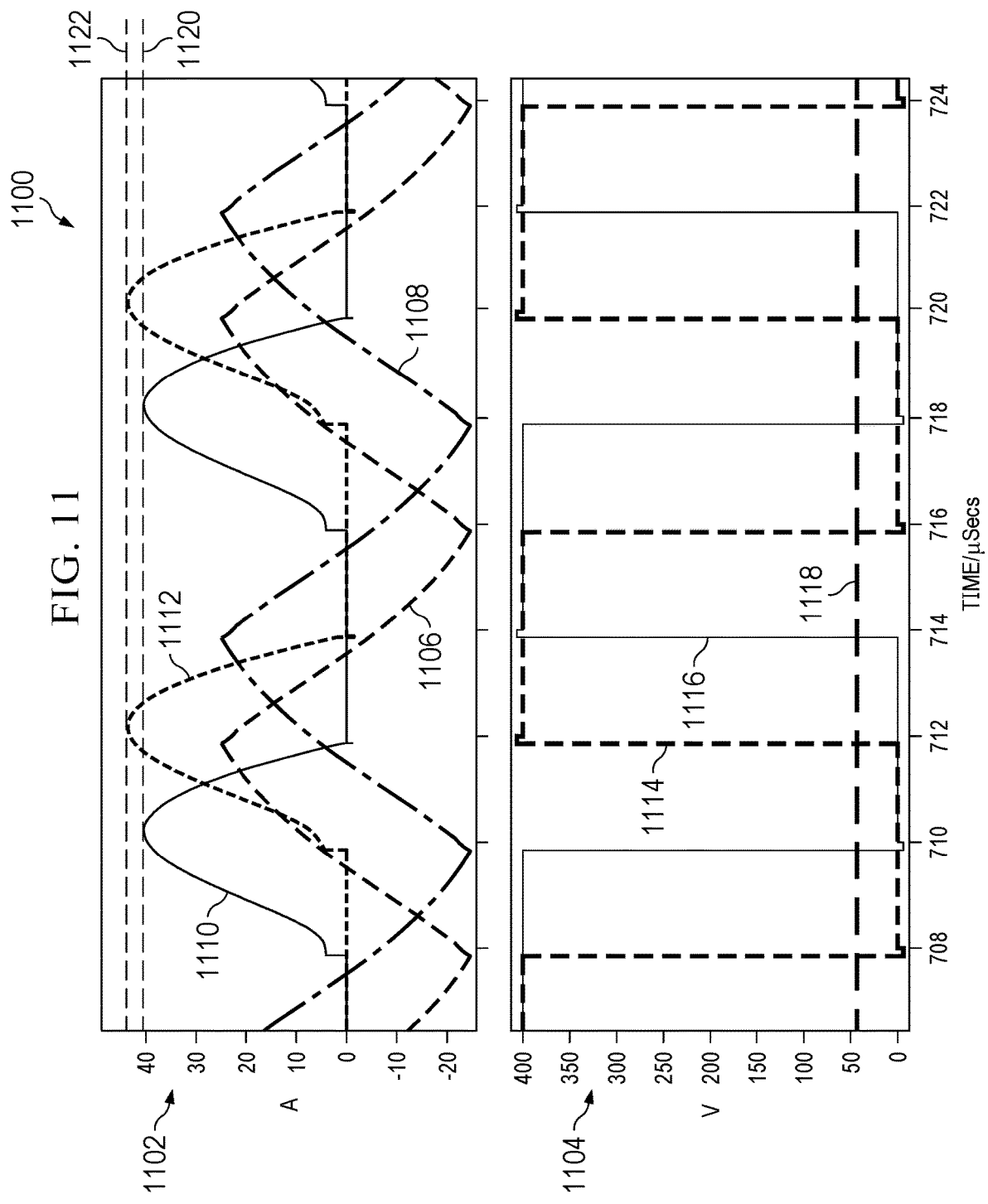
FIG. 11 is a diagram of example waveforms in the multi-phase converter without current balancing.
Figure 12:
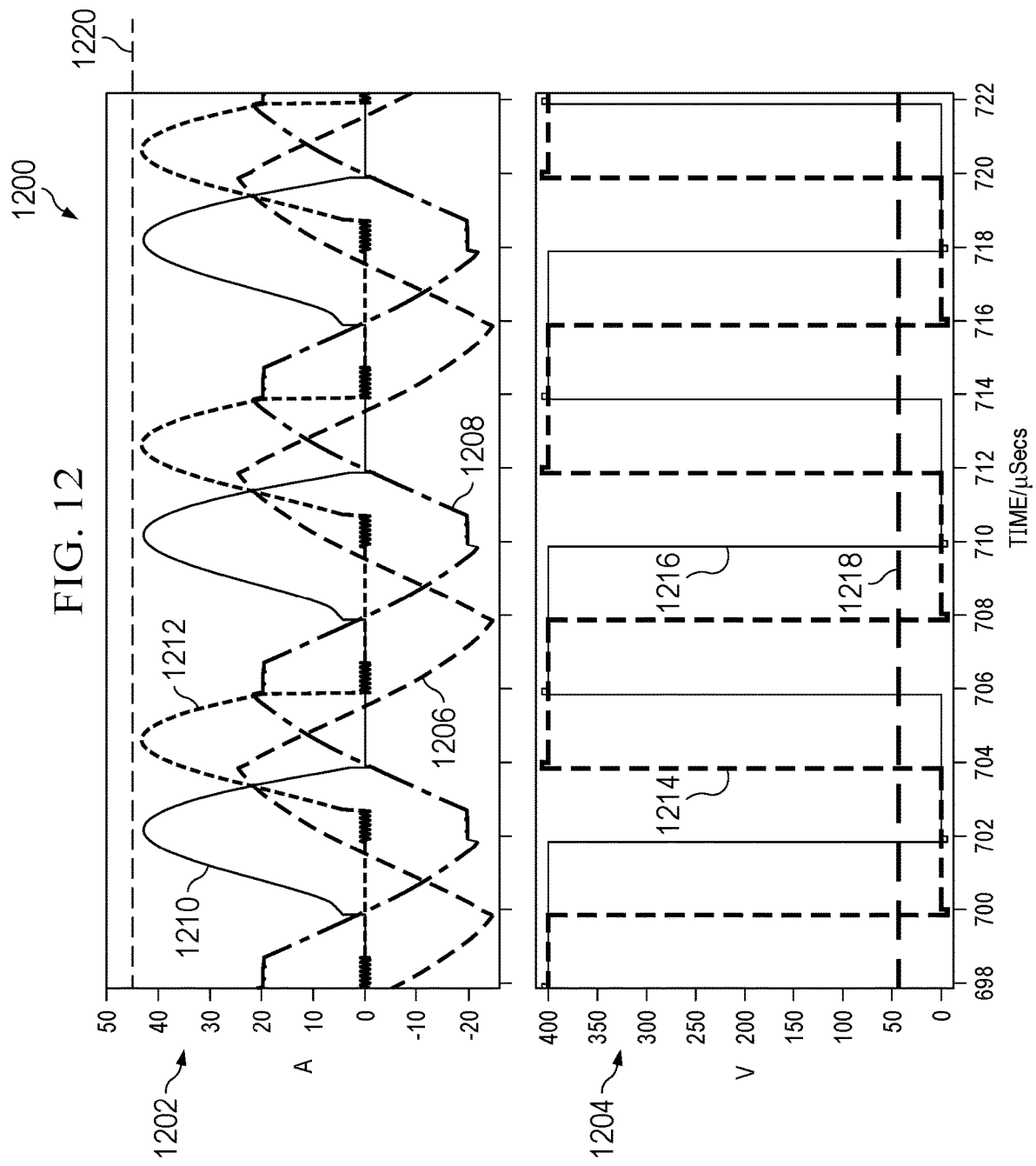
FIG. 12 is a diagram of example waveforms in the multi-phase converter with current balancing.

FIG. 11 and FIG. 12 are diagrams of example waveforms that each show simulated operation of an example implementation of the multi-phase converter 120. In FIG. 11 and FIG. 12, the first phase converter 125 and the second phase converter 126 of the multi-phase converter 120 can have different resonant tank parameters. The different resonant tank parameters can include the resonant capacitance 232, the resonant inductance 234, the resonant capacitance 332, and the resonant inductance 334 having values of about 400 nF, about 6.2 μH, about 400 nF, and about 6.0 μH, respectively. Accordingly, the resonant inductance 334 of the second phase converter 126 has a value that is about 3% less than a value of the resonant inductance 234 of the first phase converter 125. With the different resonant tank parameters, the first phase converter 125 and the second phase converter 126 can have different resonant frequencies of about 101.1 kHz and about 102.7 kHz, respectively. The simulated operations shown in FIG. 11 and FIG. 12 each involve $V_{IN}$, $V_{OUT}$, and $I_{OUT}$ having values of about 400 volts, about 46 volts, and about 50 amps, respectively.

For the simulated operation shown in FIG. 11, a controller without current balancing operates each phase converter of the multi-phase converter 120 at a switching frequency of about 125 kHz. In FIG. 11, the switching frequency is greater than both the resonant frequency of the first phase converter 125 and the resonant frequency of the second phase converter 126. The diagram 1100 includes plots 1102 and 1104. Plot 1102 represents different currents flowing in the multi-phase converter 120 as a function of time. Plot 1104 represents different voltages in the multi-phase converter 120 as a function of time. Waveforms 1106 and 1108 of the plot 1102 correspond to $I_{LR1}$ and $I_{LR2}$ flowing through the primary side 202 of the first phase converter 125 and the primary side 302 of the second phase converter 126, respectively. Waveforms 1110 and 1112 of the plot 1102 correspond to $I_{QSR1}$ and $I_{QSR3}$ flowing through the secondary side 204 of the first phase converter 125 and the secondary side 304 of the second phase converter 126, respectively. Waveforms 1114, 1116, and 1118 of the plot 1104 correspond to $V_{DS\_Q2}$ of the transistor 214 in the switching circuit 210 of the first phase converter 125, $V_{DS\_Q6}$ of the transistor 314 in the switching circuit 310 of the second phase converter 126, and $V_{OUT+}$ provided at the first converter output 123, respectively. Without current balancing, a peak current level 1120 of $I_{QSR1}$ in plot 1102 is less than a peak current level 1122 of $I_{QSR3}$, responsive to the first phase converter 125 and the second phase converter 126 having different resonant frequencies. For example, the peak current level 1122 of $I_{QSR3}$ is about 3.0 A greater than the peak current level 1120 of $I_{QSR1}$ at the switching frequency of about 125 kHz.

For the simulated operation shown in FIG. 12, the controller 140 with current balancing operates each phase the multi-phase converter 120 at a switching frequency of about 125 kHz. In FIG. 12, the switching frequency is greater than both the resonant frequency of the first phase converter 125 and the resonant frequency of the second phase converter 126. The diagram 1200 includes plots 1202 and 1204. Plot 1202 represents different currents flowing in the multi-phase converter 120 as a function of time. Plot 1204 represents different voltages in the multi-phase converter 120 as a function of time. Waveforms 1206 and 1208 of the plot 1202 correspond to $I_{LR1}$ and $I_{LR2}$ flowing through the primary side 202 of the first phase converter 125 and the primary side 302 of the second phase converter 126, respectively. Waveforms 1210 and 1212 of the plot 1202 correspond to $I_{QSR1}$ and $I_{QSR3}$ flowing through the secondary side 204 of the first phase converter 125 and the secondary side 304 of the second phase converter 126, respectively. Waveforms 1214, 1216, and 1218 of the plot 1204 correspond to $V_{DS\_Q2}$ of the transistor 214 in the switching circuit 210 of the first phase converter 125, $V_{DS\_Q6}$ of the transistor 314 in the switching circuit 310 of the second phase converter 126, and $V_{OUT+}$ provided at the first converter output 123, respectively. With current balancing, respective peak current levels of $I_{QSR1}$ and $I_{QSR3}$ are each about a peak current level 1220 in plot 1202, notwithstanding the first phase converter 125 and the second phase converter 126 having different resonant frequencies. One aspect of such current balancing involves the current balancer 144 of the controller 140 controlling a phase-shift angle between a pair of drive signals, as described above. A comparison between FIG. 11 and FIG. 12 shows that the controller 140 is useful to balance current distribution between different phase converters of the multi-phase converter 120 without controlling a resonant frequency mismatch between the different phase converters.

Figure 13:
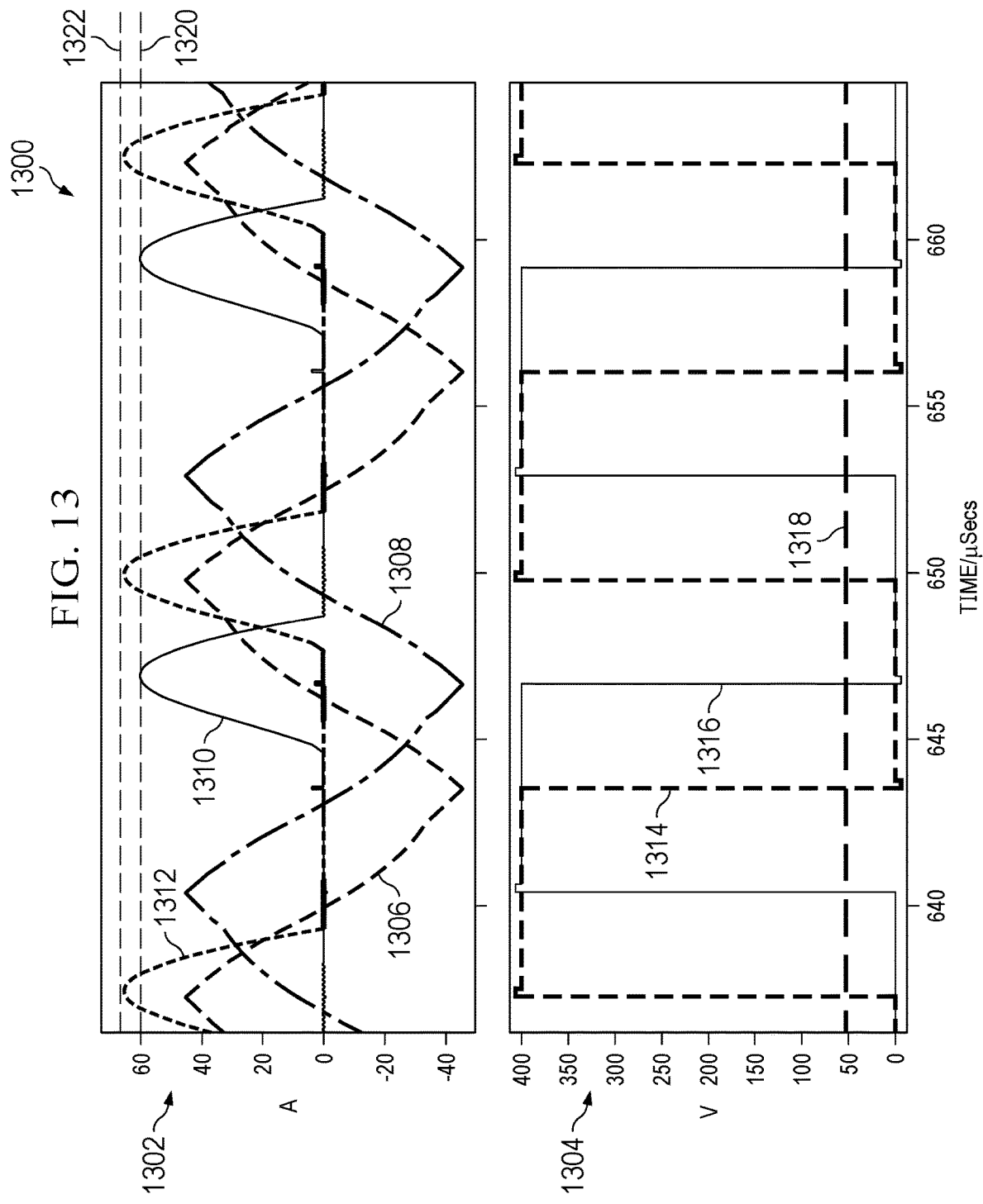
FIG. 13 is a diagram of example waveforms in the multi-phase converter without current balancing.
Figure 14:
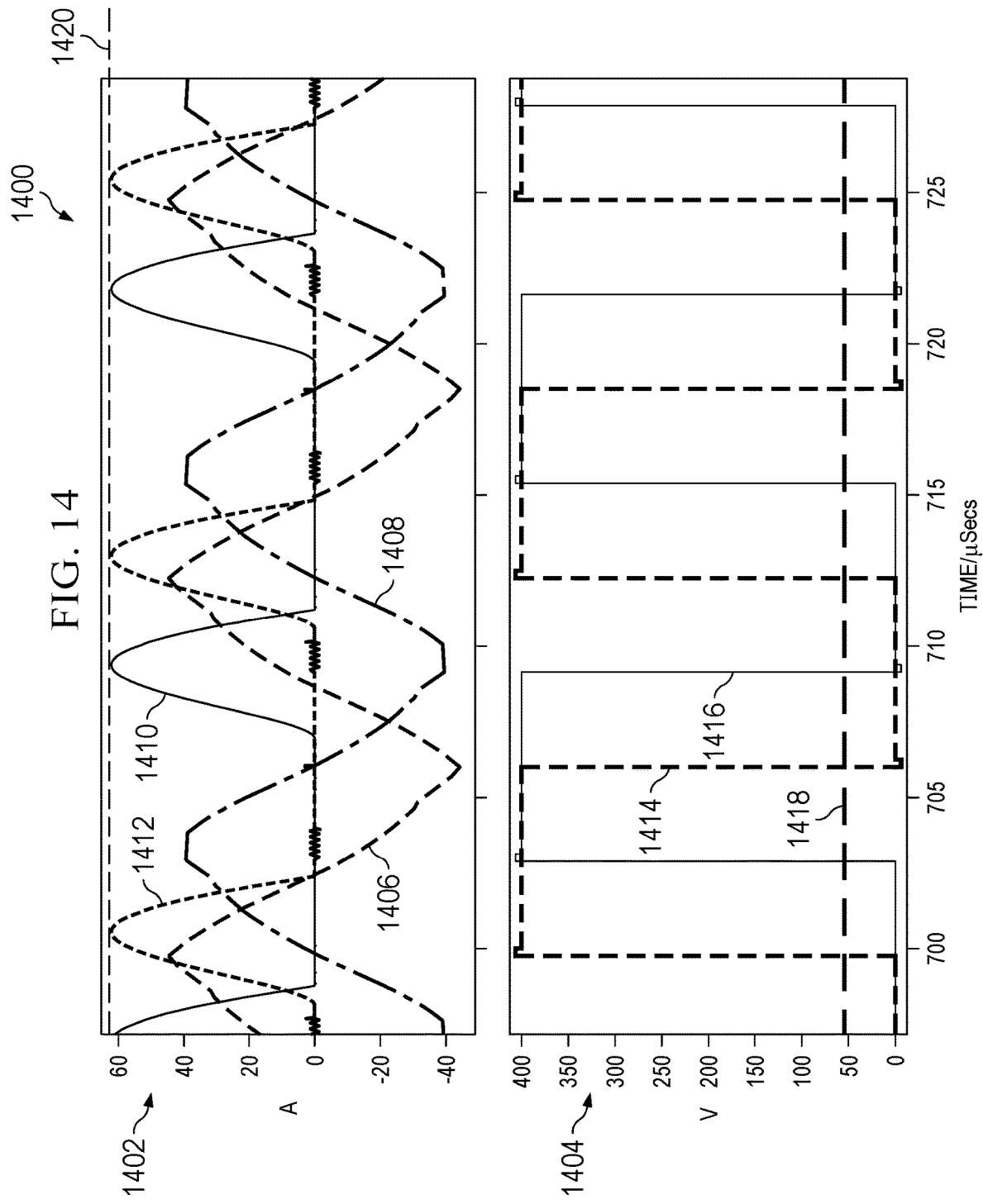
FIG. 14 is a diagram of example waveforms in the multi-phase converter with current balancing.

FIG. 13 and FIG. 14 are diagrams of example waveforms that each show simulated operation of an example implementation of the multi-phase converter 120. In FIG. 13 and FIG. 14, the first phase converter 125 and the second phase converter 126 of the multi-phase converter 120 can have different resonant tank parameters. The different resonant tank parameters can include the resonant capacitance 232, the resonant inductance 234, the resonant capacitance 332, and the resonant inductance 334 having values of about 400 nF, about 6.2 µH, about 400 nF, and about 6.0 µH, respectively. Accordingly, the resonant inductance 334 of the second phase converter 126 has a value that is about 3% less than a value of the resonant inductance 234 of the first phase converter 125. With the different resonant tank parameters, the first phase converter 125 and the second phase converter 126 can have different resonant frequencies of about 101.1 kHz and about 102.7 kHz, respectively. The simulated operations shown in FIG. 13 and FIG. 14 each involve $V_{IN}$, $V_{OUT}$, and $I_{OUT}$ having values of about 400 volts, about 46 volts, and about 50 amps, respectively.

For the simulated operation shown in FIG. 13, a controller without current balancing operates each phase converter of the multi-phase converter 120 at a switching frequency of about 80 kHz. In FIG. 13, the switching frequency is less than both the resonant frequency of the first phase converter 125 and the resonant frequency of the second phase converter 126. The diagram 1300 includes plots 1302 and 1304. Plot 1302 represents different currents flowing in the multi-phase converter 120 as a function of time. Plot 1304 represents different voltages in the multi-phase converter 120 as a function of time. Waveforms 1306 and 1308 of the plot 1302 correspond to $I_{LR1}$ and $I_{LR2}$ flowing through the primary side 202 of the first phase converter 125 and the primary side 302 of the second phase converter 126, respectively. Waveforms 1310 and 1312 of the plot 1302 correspond to $I_{QSR1}$ and $I_{QSR3}$ flowing through the secondary side 204 of the first phase converter 125 and the secondary side 304 of the second phase converter 126, respectively. Waveforms 1314, 1316, and 1318 of the plot 1304 correspond to $V_{DS\_Q2}$ of the transistor 214 in the switching circuit 210 of the first phase converter 125, $V_{DS\_Q6}$ of the transistor 314 in the switching circuit 310 of the second phase converter 126, and $V_{OUT+}$ provided at the first converter output 123, respectively. Without current balancing, a peak current level 1320 of $I_{QSR1}$ in plot 1302 is less than a peak current level 1322 of $I_{QSR3}$, responsive to the first phase converter 125 and the second phase converter 126 having different resonant frequencies. For example, the peak current level 1322 of $I_{QSR3}$ is about 2.7 A greater than the peak current level 1320 of $I_{QSR1}$ at the switching frequency of about 80 kHz.

For the simulated operation shown in FIG. 14, the controller 140 with current balancing operates each phase the multi-phase converter 120 at a switching frequency of about 80 kHz. In FIG. 14, the switching frequency is less than both the resonant frequency of the first phase converter 125 and the resonant frequency of the second phase converter 126. The diagram 1400 includes plots 1402 and 1404. Plot 1402 represents different currents flowing in the multi-phase converter 120 as a function of time. Plot 1404 represents different voltages in the multi-phase converter 120 as a function of time. Waveforms 1406 and 1408 of the plot 1402 correspond to $I_{LR1}$ and $I_{LR2}$ flowing through the primary side 202 of the first phase converter 125 and the primary side 302 of the second phase converter 126, respectively. Waveforms 1410 and 1412 of the plot 1402 correspond to $I_{QSR1}$ and $I_{QSR3}$ flowing through the secondary side 204 of the first phase converter 125 and the secondary side 304 of the second phase converter 126, respectively. Waveforms 1414, 1416, and 1418 of the plot 1404 correspond to $V_{DS\_Q2}$ of the transistor 214 in the switching circuit 210 of the first phase converter 125, $V_{DS\_Q6}$ of the transistor 314 in the switching circuit 310 of the second phase converter 126, and $V_{OUT+}$ provided at the first converter output 123, respectively. With current balancing, respective peak current levels of $I_{QSR1}$ and $I_{QSR3}$ are each about a peak current level 1420 in plot 1402, notwithstanding the first phase converter 125 and the second phase converter 126 having different resonant frequencies. One aspect of such current balancing involves the current balancer 144 of the controller 140 controlling a phase-shift angle between a pair of drive signals, as described above. A comparison between FIG. 13 and FIG. 14 shows that the controller 140 is useful to balance current distribution between different phase converters of the multi-phase converter 120 without controlling a resonant frequency mismatch between the different phase converters.

Figure 15:
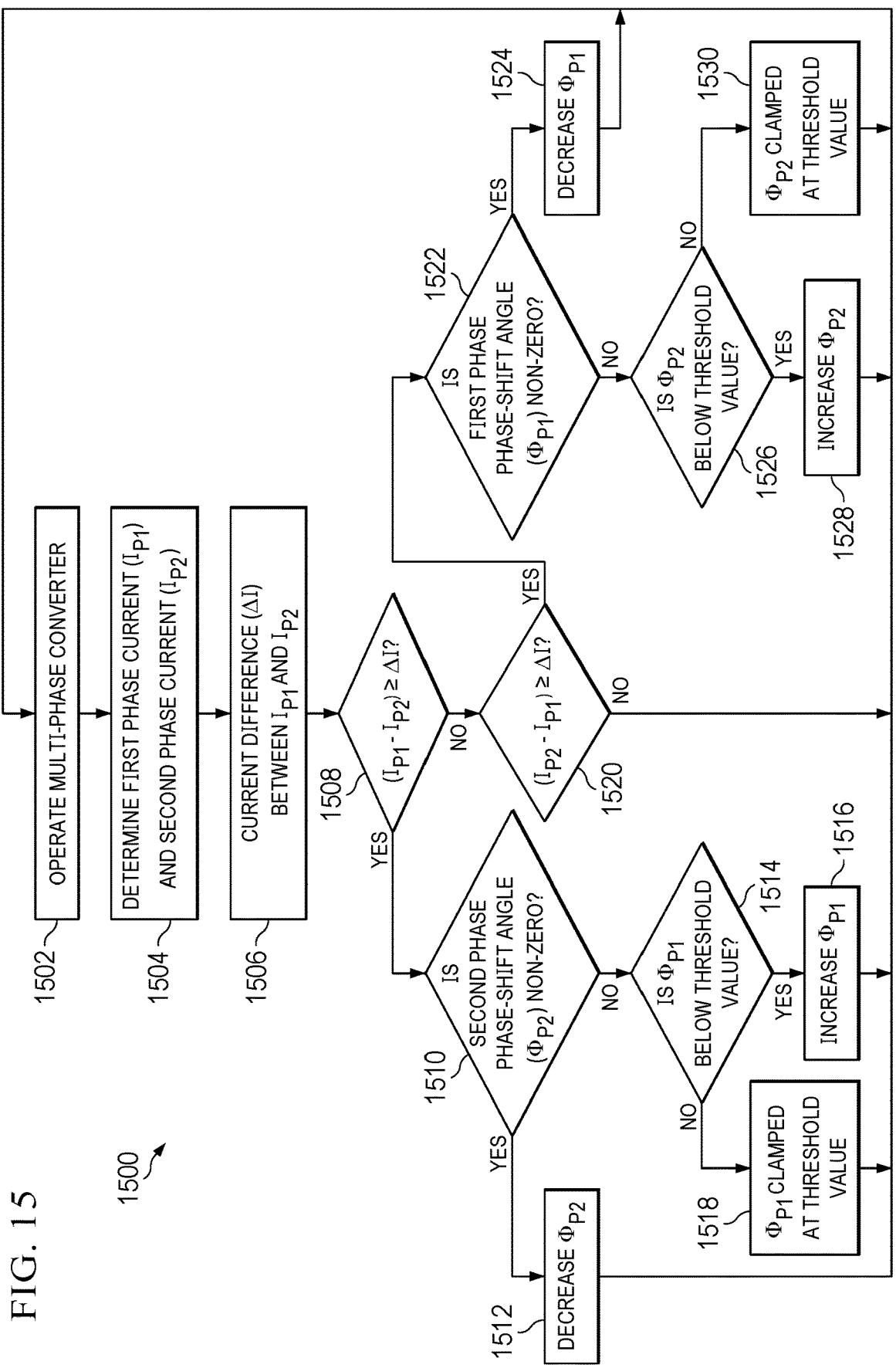
FIG. 15 is a flow diagram of an example method of current balancing for a multi-phase converter.

FIG. 15 is a flow diagram of an example method 1500 of current balancing for a multi-phase converter. The steps of method 1500 may be performed in any suitable order. The hardware components described above with respect to FIGS. 1, 2, 3, and 4 may perform method 1500 in some examples. Any suitable hardware or digital logic may perform method 1500 in some examples. In at least one example, the method 1500 is performed within the system 100 by the controller 140. The method 1500 includes operating a multi-phase converter, at step 1502. The multi-phase converter can include a first phase and a second phase coupled in a current sharing configuration (e.g., in parallel) with the first phase. Operating the multi-phase converter at step 1502 can involve providing switching control signals (e.g., $SCQ_1$, $SCQ_2$, $SCQ_3$, and/or $SCQ_4$) to control operation of the first phase and/or providing switching control signals (e.g., $SCQ_5$, $SCQ_6$, $SCQ_7$, and/or $SCQ_8$) to control operation of the second phase. For example, the pulse generator 420 is configured to provide a number of switching control signals (e.g., $SCQ_1$, $SCQ_2$, $SCQ_3$, and/or $SCQ_4$) to the driver input interface of the gate driver 220 via the controller output 142 to control operation of the first phase converter 125 of the multi-phase converter 120. Another example, is configured to provide a number of switching control signals (e.g., $SCQ_5$, $SCQ_6$, $SCQ_7$, and/or $SCQ_8$) to the driver input interface of the gate driver 320 via the controller output 142 to control operation of the second phase converter 126 of the multi-phase converter 120.

At step 1504, the method 1500 includes determining a first phase current (e.g., $I_{P1}$) and a second phase current (e.g., $I_{P2}$). For example, the current sense circuit 144 is coupled to a secondary side of the multi-phase converter 120 via the controller input 141. In this example, the current sources 406 and 408 of the current sense circuit 144 are configured to provide a first sense current ($I_{SNS\_1}$) and a second sense current ($I_{SNS\_2}$). $I_{SNS\_1}$ and $I_{SNS\_2}$ can be proportional to $I_{P1}$ flowing through the first phase converter 125 and to $I_{P2}$ flowing through the second phase converter 126, respectively. At step 1506, the method 1500 includes determining a difference (e.g., $\Delta I$) between the first phase current and the second phase current determined at step 1504. For example, the imbalance detector 146 is configured to provide, responsive to $I_{SNS\_1}$ and $I_{SNS\_2}$, an error signal (e.g., $V_{ERROR}$) that is indicative of a difference (e.g., $\Delta I$) between $I_{P1}$ and $I_{P2}$.

At step 1508, the method 1500 includes comparing the difference determined at step 1506 with a result obtained by subtracting the second phase current determined at step 1504 from the first phase current determined at step 1504. For example, the error signal (e.g., $V_{ERROR}$) provided by the imbalance detector 146 is indicative of unbalanced current distribution between the first phase converter 125 and the second phase converter 126. Being proportional to $I_{P1}$ and to $I_{P2}$, respectively, $I_{SNS\_1}$ and $I_{SNS\_2}$ can be useful to determine ΔI or the unbalanced current distribution between the first phase converter 125 and the second phase converter 126. In this example, the current balancer 148 is configured to control, responsive to the error signal (e.g., $V_{ERROR}$), a phase-shift angle (e.g., $\Phi_{PN}$) between drive signals provided to different switches of a given phase converter of the multi-phase converter 120. If the comparison at step 1508 determines that the difference determined at step 1506 is less than or about equal to the result obtained by subtracting the second phase current determined at step 1504 from the first phase current determined at step 1504, the method 1500 proceeds to step 1510. Alternatively, if the comparison at step 1508 determines that the difference determined at step 1506 exceeds the result obtained by subtracting the second phase current determined at step 1504 from the first phase current determined at step 1504, the method 1500 proceeds to step 1520.

At step 1510, the method 1500 includes evaluating whether a phase-shift angle (second phase-shift angle) between the switching control signals (e.g., $SCQ_5$, $SCQ_6$, $SCQ_7$, and/or $SCQ_8$) provided to control operation of the second phase converter of the multi-phase converter at step 1502 is non-zero. In at least one example, the second phase-shift angle is $\Phi_{P2}$, as described above. In at least one example, the evaluation at step 1510 involves evaluating the second phase-shift angle between the switching control signals provided to control operation of different switches of the second phase. In at least one example, the switching control signals provided to control operation of different switches of the second phase are $SCQ_5$ and $SCQ_8$. In at least one example, the switching control signals provided to control operation of different switches of the second phase are $SCQ_6$ and $SCQ_7$. In at least one example, the different switches of the second phase are diagonally opposite switches in different legs of a full-bridge switching circuit. If the evaluation at step 1510 determines that the second phase-shift angle is non-zero, the method 1500 proceeds to step 1512. Alternatively, if the evaluation at step 1510 determines that the second phase-shift angle is zero or about zero, the method 1500 proceeds to step 1514.

At step 1512, the method 1500 includes decreasing the second phase-shift angle and the method 1500 proceeds to step 1502. At step 1514, the method 1500 includes evaluating whether a phase-shift angle (first phase-shift angle) between the switching control signals (e.g., $SCQ_1$, $SCQ_2$, $SCQ_3$, and/or $SCQ_4$) provided to control operation of the first phase converter of the multi-phase converter at step 1502 is below a programmed value (e.g., $\Phi_{TH}$). For example, the clamping circuit 410 is configured to control, responsive to the first phase-shift angle (e.g., $\Phi_{P1}$) exceeding the programmed value (e.g., $\Phi_{TH}$), the first phase-shift angle to the programmed value. In this example, a feedback path between the pulse generator 420 and the clamping circuit 410 can be useful to maintain the first phase-shift angle within a range of values that the first phase converter 125 of the multi-phase converter 120 can support. If the evaluation at step 1514 determines that the first phase-shift angle is below the programmed value, the method 1500 proceeds to step 1516. Alternatively, if the evaluation at step 1510 determines that the first phase-shift angle is about equal to or above the programmed value, the method 1500 proceeds to step 1518. At step 1516, the method 1500 includes increasing the first phase-shift angle and the method 1500 proceeds to step 1502. At step 1518, the method 1500 includes controlling the first phase-shift angle to the programmed value and the method 1500 proceeds to step 1502.

At step 1520, the method 1500 includes comparing the difference determined at step 1506 with a result obtained by subtracting the first phase current determined at step 1504 from the second phase current determined at step 1504. For example, the error signal (e.g., $V_{ERROR}$) provided by the imbalance detector 146 is indicative of unbalanced current distribution between the first phase converter 125 and the second phase converter 126. Being proportional to $I_{P1}$ and to $I_{P2}$, respectively, $I_{SNS\_1}$ and $I_{SNS\_2}$ can be useful to determine ΔI or the unbalanced current distribution between the first phase converter 125 and the second phase converter 126. In this example, the current balancer 148 is configured to control, responsive to the error signal (e.g., $V_{ERROR}$), a phase-shift angle (e.g., $\Phi_{PN}$) between drive signals provided to different switches of a given phase converter of the multi-phase converter 120. If the comparison at step 1520 determines that the difference determined at step 1506 is less than or about equal to the result obtained by subtracting the first phase current determined at step 1504 from the second phase current determined at step 1504, the method 1500 proceeds to step 1522. Alternatively, if the comparison at step 1520 determines that the difference determined at step 1506 is greater than the result obtained by subtracting the first phase current determined at step 1504 from the second phase current determined at step 1504, the method 1500 proceeds to step 1502.

At step 1522, the method 1500 includes evaluating whether the first phase-shift angle between the switching control signals (e.g., $SCQ_1$, $SCQ_2$, $SCQ_3$, and/or $SCQ_4$) provided to control operation of the first phase converter of the multi-phase converter at step 1502 is non-zero. In at least one example, the first phase-shift angle is $\Phi_{P1}$, as described above. In at least one example, the evaluation at step 1522 involves evaluating the first phase-shift angle between the switching control signals provided to control operation of different switches of the first phase. In at least one example, the switching control signals provided to control operation of different switches of the first phase are $SCQ_1$ and $SCQ_4$. In at least one example, the switching control signals provided to control operation of different switches of the first phase are $SCQ_2$ and $SCQ_3$. In at least one example, the different switches of the first phase are diagonally opposite switches in different legs of a full-bridge switching circuit. If the evaluation at step 1522 determines that the first phase-shift angle is non-zero, the method 1500 proceeds to step 1524. Alternatively, if the evaluation at step 1522 determines that the first phase-shift angle is zero or about zero, the method 1500 proceeds to step 1526. At step 1524, the method 1500 includes decreasing the first phase-shift angle and the method 1500 proceeds to step 1502.

At step 1526, the method 1500 includes evaluating whether the second phase-shift angle is below a programmed value (e.g., $\Phi_{TH}$). For example, the clamping circuit 410 is configured to control, responsive to the second phase-shift angle (e.g., $\Phi_{P2}$) exceeding the programmed value (e.g., $\Phi_{TH}$), the second phase-shift angle to the programmed value. In this example, a feedback path between the pulse generator 420 and the clamping circuit 410 can be useful to maintain the second phase-shift angle within a range of values that the second phase converter 126 of the multi-phase converter 120 can support. If the evaluation at step 1526 determines that the second phase-shift angle is below the programmed value, the method 1500 proceeds to step 1528. Alternatively, if the evaluation at step 1526 determines that the second phase-shift angle is about equal to or above the programmed value, the method 1500 proceeds to block step. At block step, the method 1500 includes increasing the second phase-shift angle and the method 1500 proceeds to step 1502. At step 1530, the method 1500 includes controlling the second phase-shift angle to the programmed value and the method 1500 proceeds to step 1502.

In this description, the term "couple" may cover connections, communications or signal paths that enable a functional relationship consistent with this description. For example, if device A provides a signal to control device B to perform an action, then: (a) in a first example, device A is directly connected to device B; or (b) in a second example, device A is coupled to device B through intervening component C if intervening component C does not alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components and forming the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources and forming the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within ±10 percent of that parameter. Modifications are possible in the described examples, and other examples are possible within the scope of the claims.

What is claimed is:

1. An apparatus comprising:
   a current sense circuit including a first phase input, a second phase input, a first sense output, and a second sense output;
   an imbalance detector having a detector output, a first detector input, and second detector input, wherein the first detector input is coupled to the first sense output and the second detector input is coupled to the second sense output;
   a current balancer having a balancer input and a balancer output, wherein the balancer input is coupled to the detector output;
   a clamping circuit having a clamping input, a feedback input, and a clamping output, wherein the clamping input is coupled to the balancer output;
   a pulse generator having a generator input, a generator output, and a feedback output, wherein the generator input is coupled to the clamping output; and
   a feedback path from the feedback output of the pulse generator to the feedback input of the clamping circuit.

2. The apparatus of claim 1, wherein the current sense circuit further includes a current source coupled between the first phase input and the first sense output.

3. The apparatus of claim 1, wherein the first phase input is a first phase current input, and the second phase input is a second phase current input.

4. The apparatus of claim 1, wherein the current sense circuit further includes a current mirror coupled between the second phase input and the second sense output.

5. An apparatus comprising:
   a current sense circuit including a first phase input and a second phase input, wherein the current sense circuit is configured to provide a first sense output and a second sense output;
   an imbalance detector coupled to the current sense circuit, wherein the imbalance detector is configured to provide, responsive to the first sense output and the second sense output, an error signal that is indicative of a difference between a first current provided at the first phase input and a second current provided at the second phase input;
   a current balancer coupled to the imbalance detector, wherein the current balancer is configured to control, responsive to the error signal, a phase-shift angle between drive signals to reduce the difference between the first current and the second current;
   a clamping circuit coupled to the current balancer, wherein the clamping circuit includes a feedback input;
   a pulse generator coupled to the clamping circuit, wherein the pulse generator includes a feedback output; and
   a feedback path coupled between the feedback output of the pulse generator to the feedback input of the clamping circuit.

6. The apparatus of claim 5, wherein the second current provided at the second phase input changes responsive to the phase-shift angle changing in value.

7. The apparatus of claim 5, wherein the current balancer is configured to control the phase-shift angle without controlling a resonant frequency mismatch.

8. The apparatus of claim 5, wherein the first current provided at the first phase input increases responsive to the phase-shift angle decreasing in value.

9. The apparatus of claim 5, wherein the pulse generator is configured to control, responsive to the phase-shift angle, a delay between switching control signals provided to a gate driver providing the drive signals.

10. The apparatus of claim 5, wherein the phase-shift angle controls an intraphase delay between switching control signals.

11. The apparatus of claim 5, wherein the first current provided at the first phase input is a rectifier current.

12. The apparatus of claim 5, wherein the clamping circuit is configured to control, responsive to the phase-shift angle exceeding a programmed value, the phase-shift angle to the programmed value.

13. A system comprising:
    a multi-phase converter having a first phase converter and a second phase converter coupled in a current sharing configuration; and
    a controller coupled to the multi-phase converter, the controller including:
        an imbalance detector configured to, responsive to a first current flowing through the first phase converter and a second current flowing through the second phase converter, provide an error signal that is indicative of a difference between the first current and the second current;
        a current balancer coupled between a gate driver of the multi-phase converter and the imbalance detector, the current balancer configured to, responsive to the error signal, control a phase-shift angle between drive signals provided to a set of different switches of the first phase converter;
        a clamping circuit coupled to the current balancer, wherein the clamping circuit includes a feedback input;
        a pulse generator coupled to the clamping circuit, wherein the pulse generator includes a feedback output; and
        a feedback path coupled between the feedback output of the pulse generator to the feedback input of the clamping circuit.

14. The system of claim 13, wherein the multi-phase converter is an interleaved LLC converter.

15. The system of claim 13, wherein the multi-phase converter is configured to, responsive to the phase-shift angle increasing in value, decrease the first current flowing through the first phase converter to reduce the difference between the first current and the second current without controlling an asymmetry between respective resonant frequencies of the first phase converter and the second phase converter.

16. The system of claim 13, wherein the multi-phase converter is configured to, responsive to the phase-shift angle decreasing in value, increase the first current flowing through the first phase converter to reduce the difference between the first current and the second current without reducing a symmetry between respective switching frequencies of the first phase converter and the second phase converter.

17. The system of claim 13, wherein the first phase converter includes a transformer that electrically isolates the set of different switches of the first phase converter from the first current flowing through the first phase converter.

* * * * *